Figure 1:
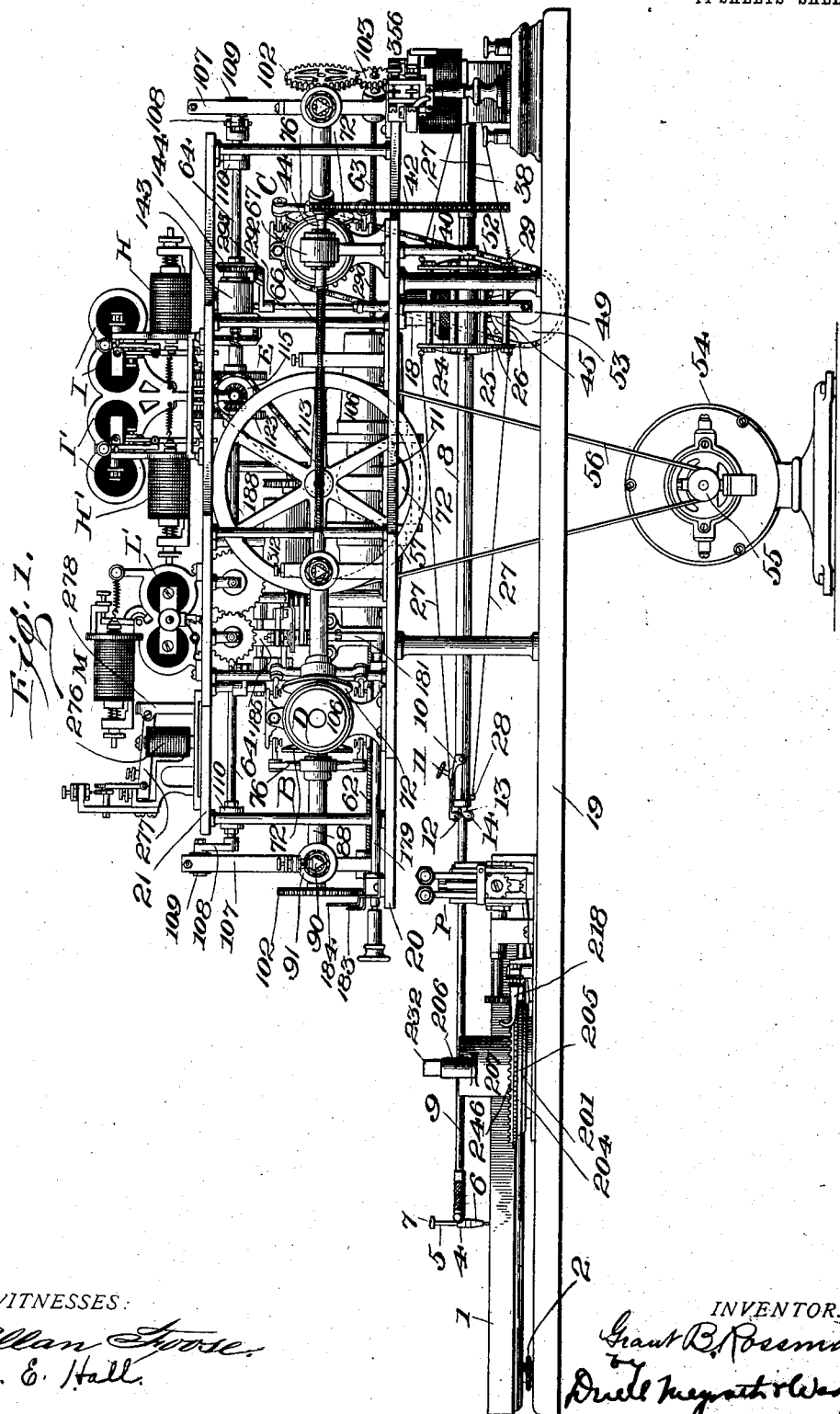

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 2.

WITNESSES: INVENTOR.
Allan Foose. Grant B. Rossman
Mary E. Hall. BY
Duell Ingraham & Wexfield
ATTORNEYS.

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 3.

WITNESSES:
INVENTOR.
ATTORNEYS.

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 4.

WITNESSES: INVENTOR.
Grant B. Rossman
BY
ATTORNEYS

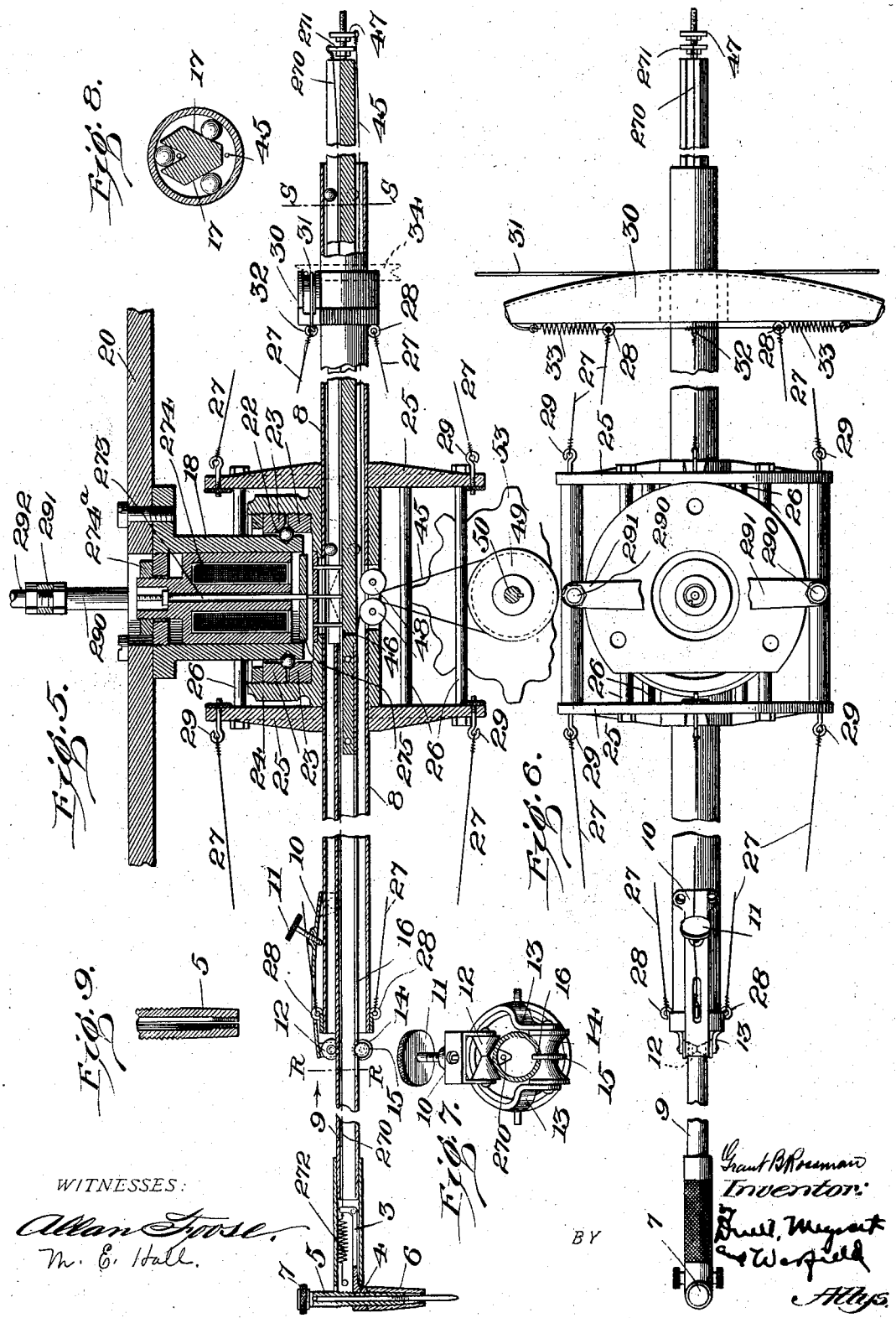

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 6.
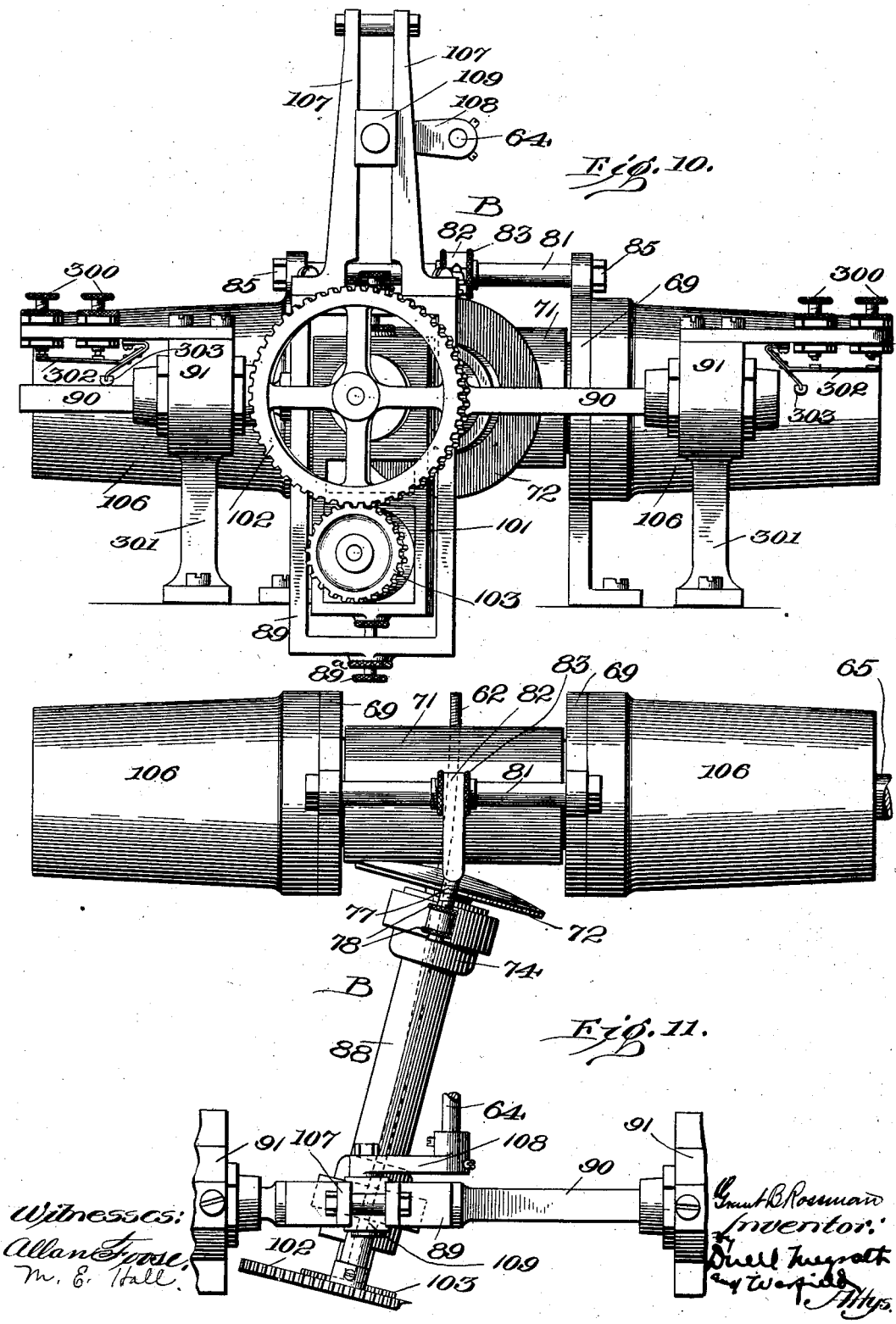

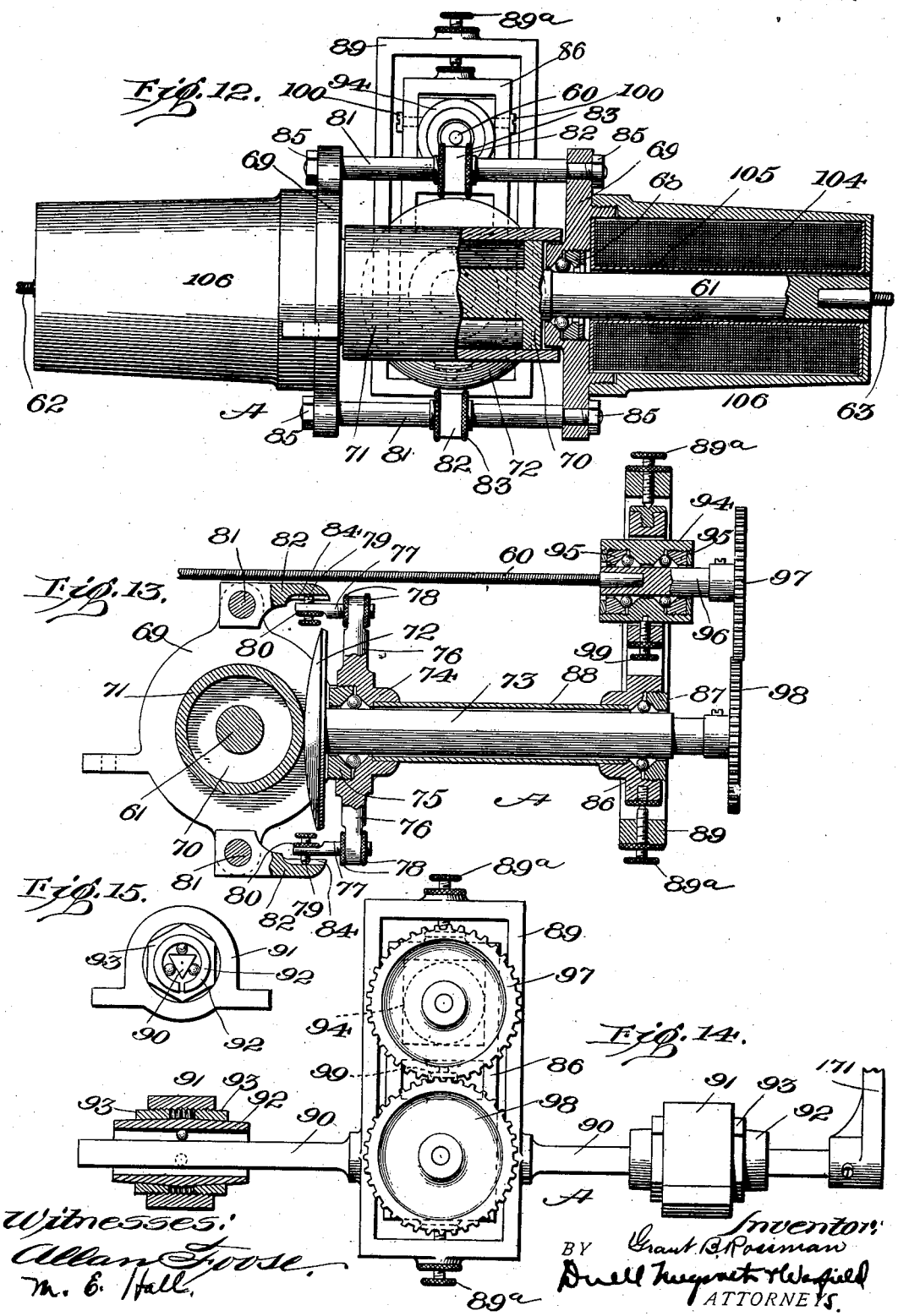

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 8.
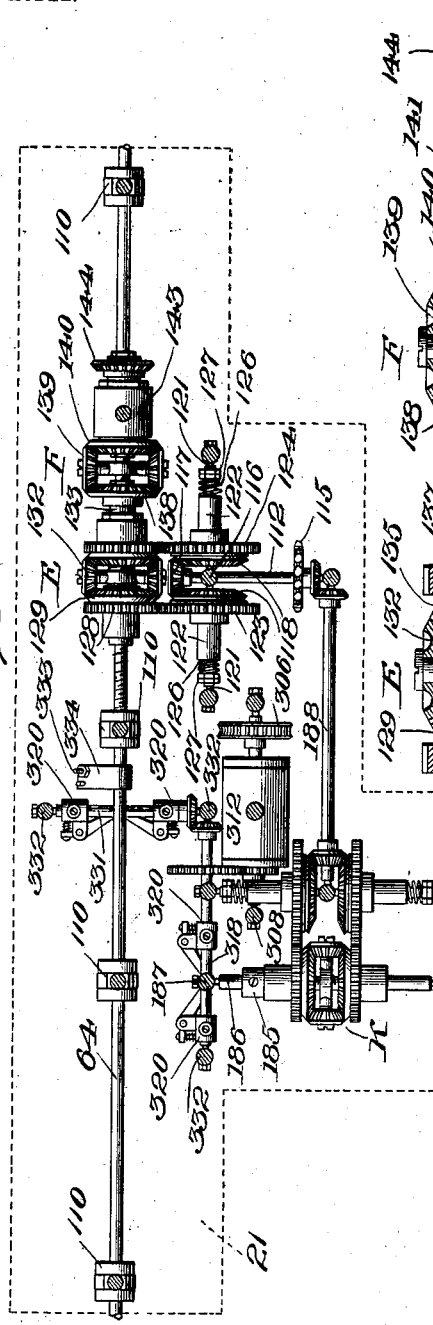
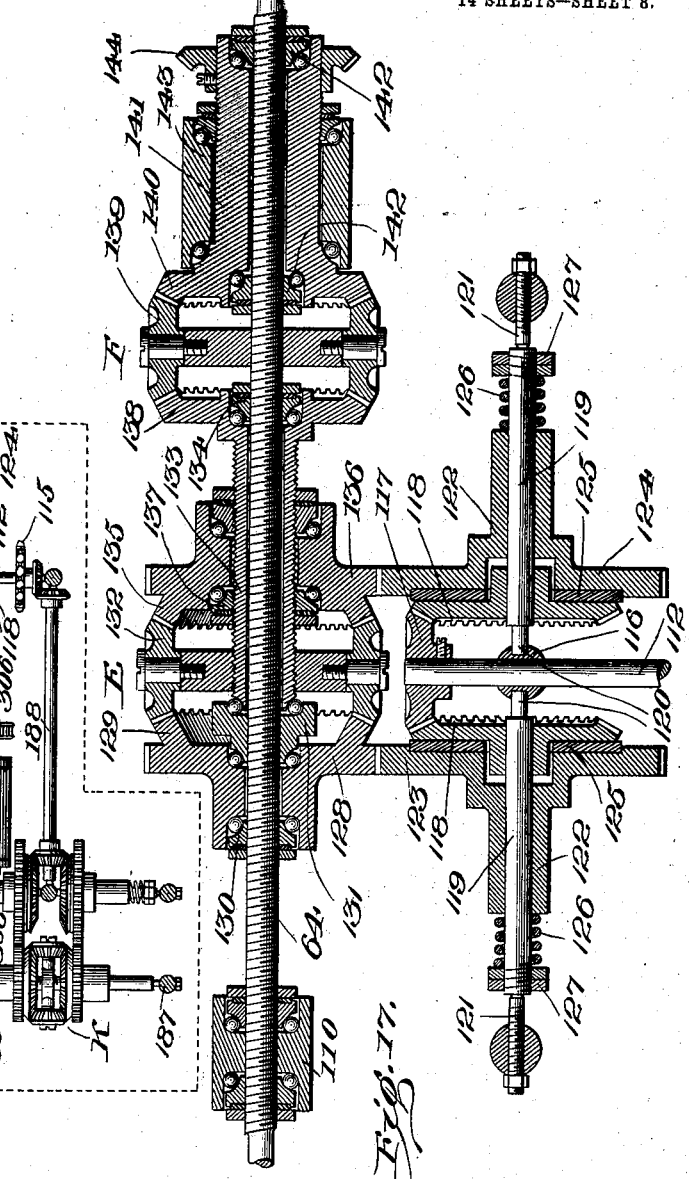
WITNESSES:
Allan Foose
M. E. Hall
INVENTOR.
Grant B. Rossman
BY
Duell Megrath & Warfield
ATTORNEYS No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 9.
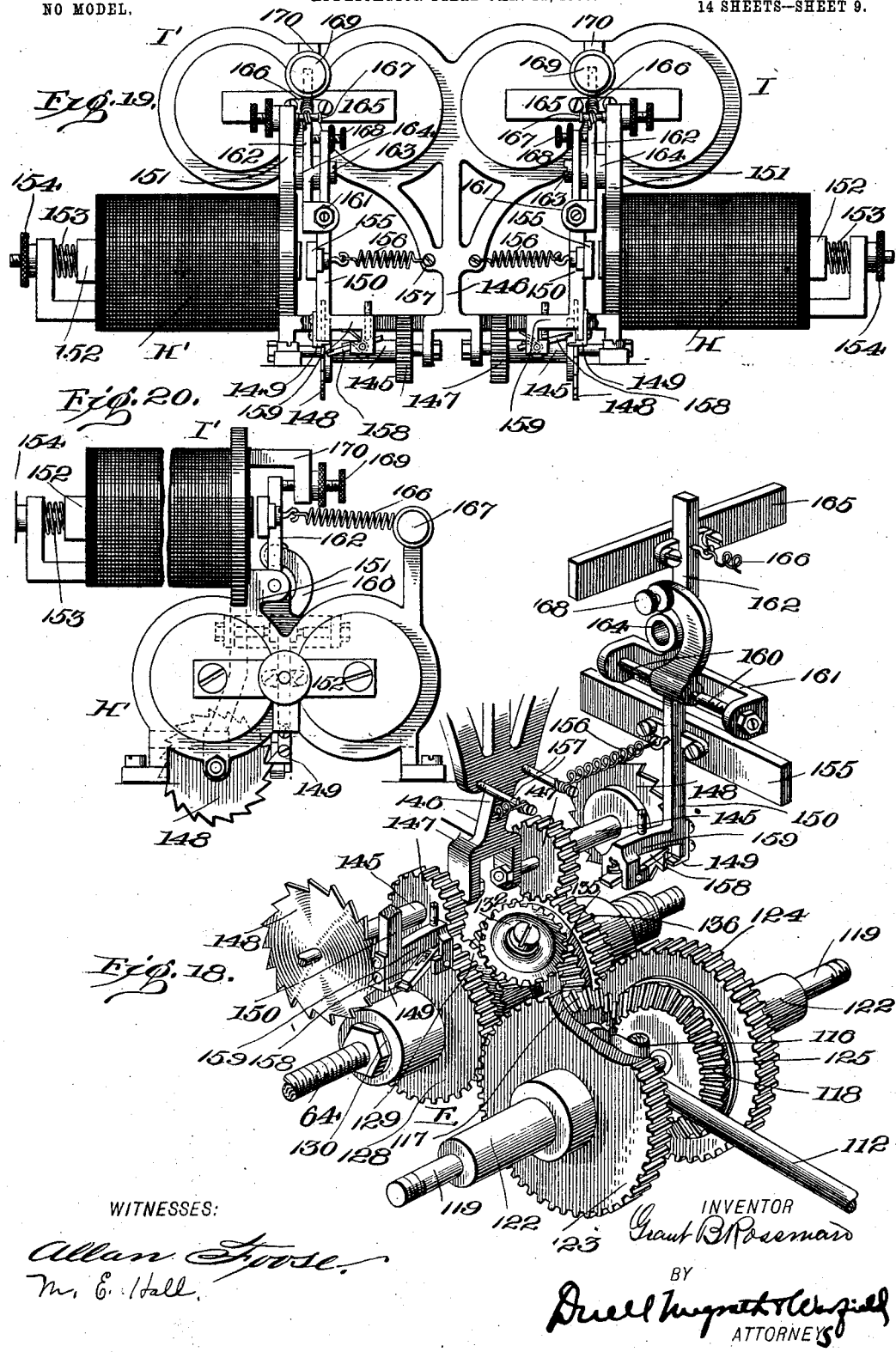
WITNESSES:
INVENTOR
BY
ATTORNEYS No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 10.
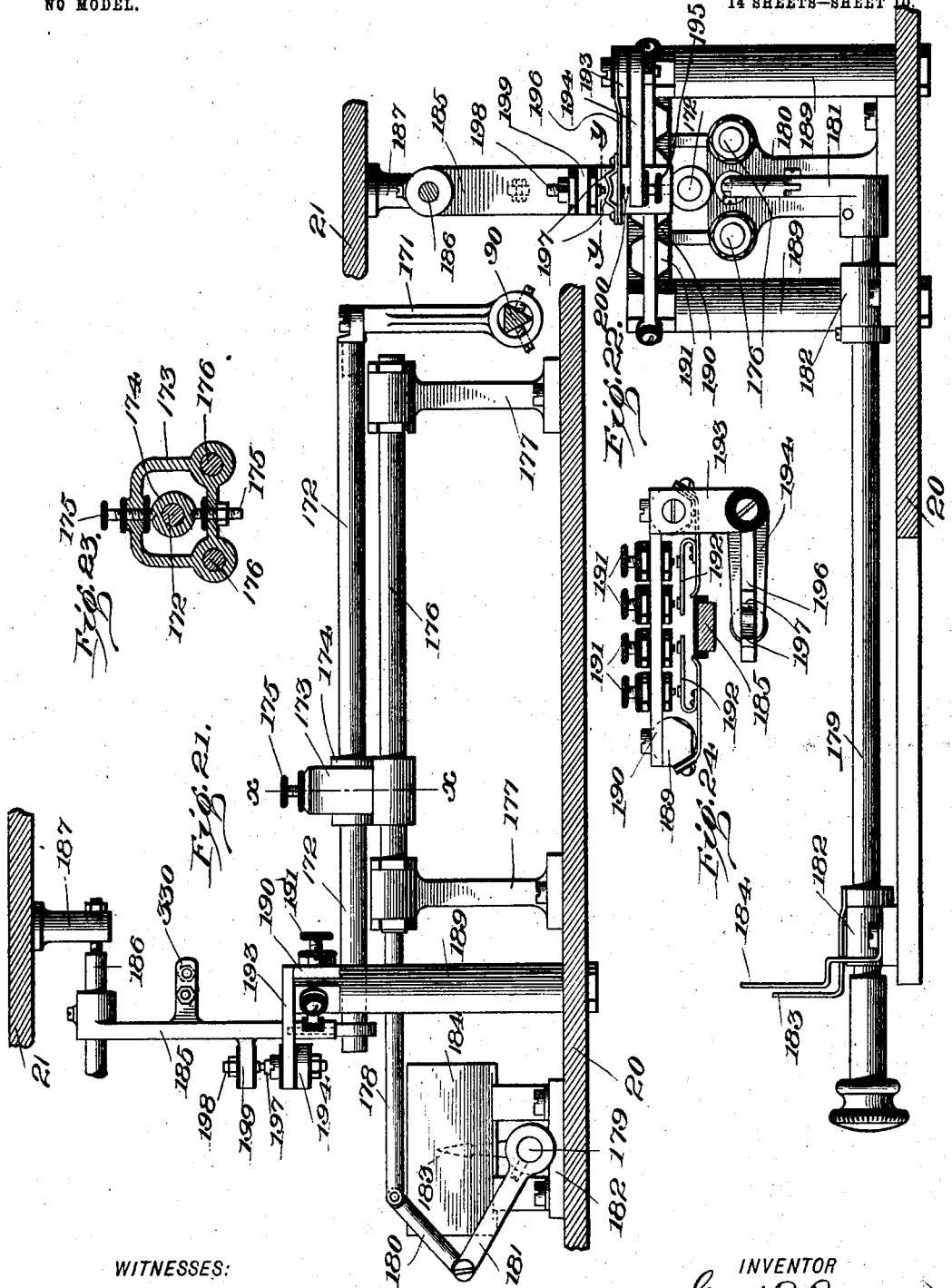
WITNESSES:
INVENTOR
BY
ATTORNEYS.

No. 742,065. PATENTED OCT. 20, 1903.
G. B. ROSSMAN.
METHOD OF DEVELOPING, RECORDING, OR TRANSMITTING GRAPHIC PROCESSES.
APPLICATION FILED JAN. 12, 1903.
NO MODEL. 14 SHEETS—SHEET 11.
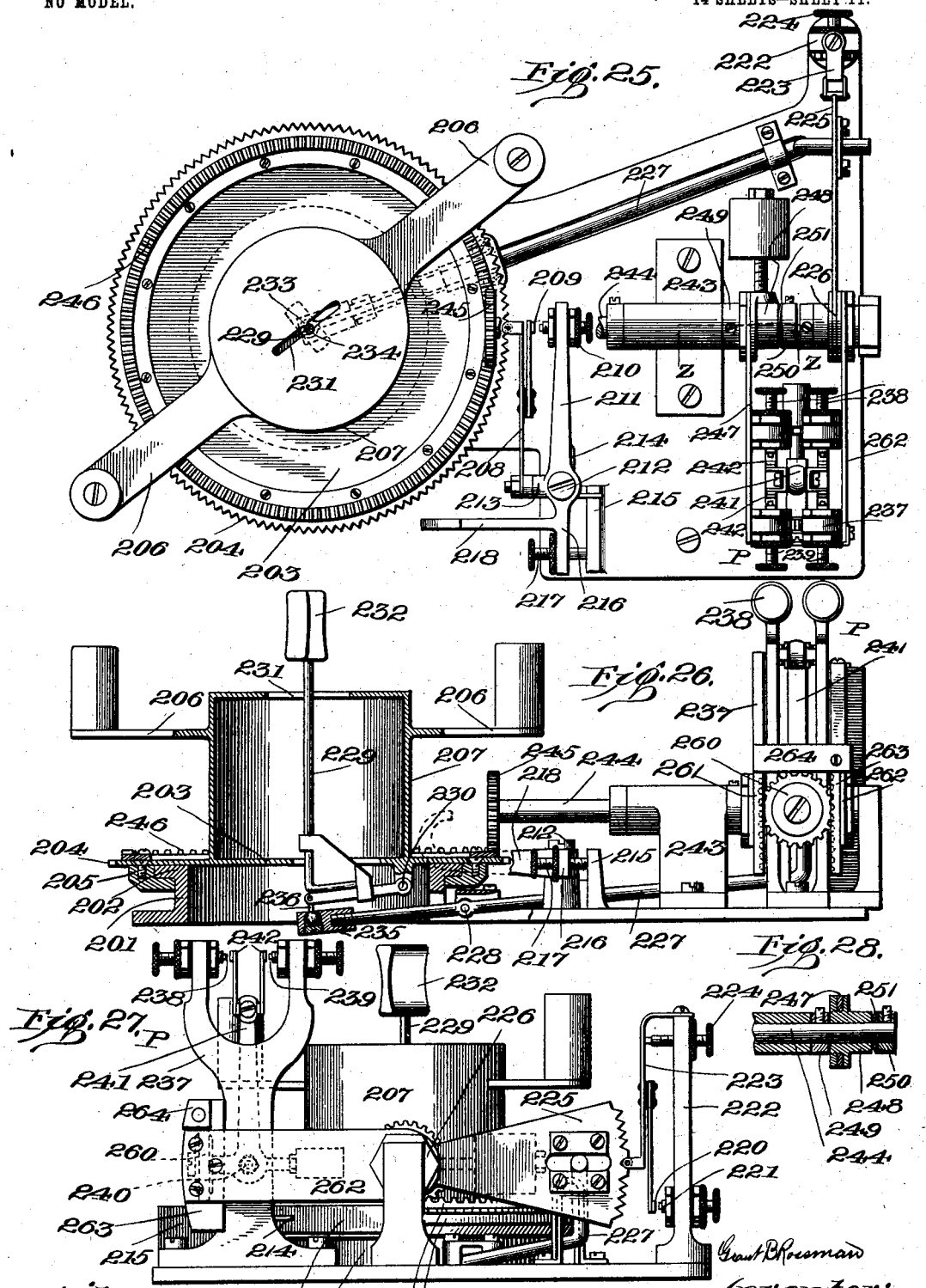

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 12.
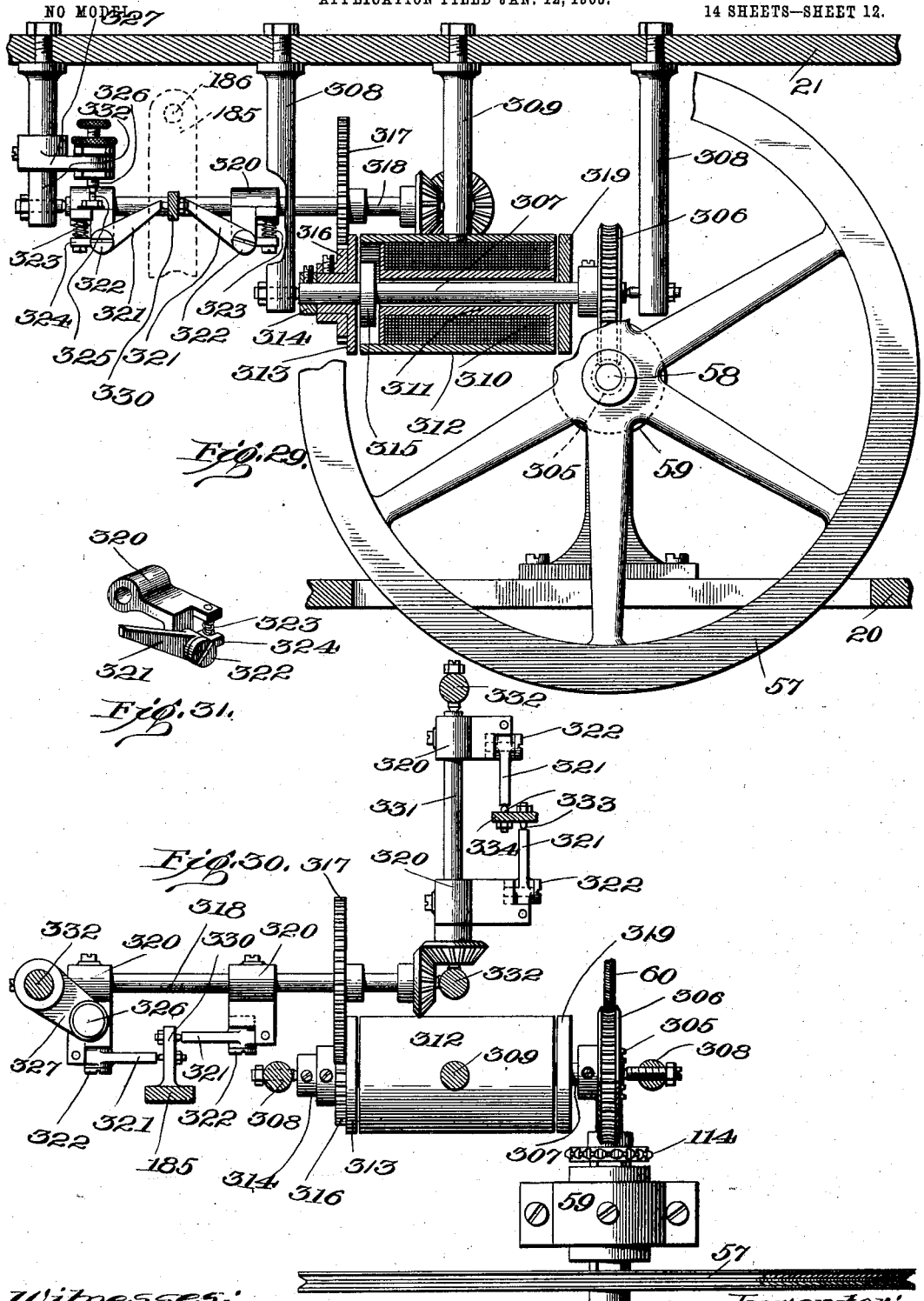
Witnesses:
Allan Foose.
M. E. Hall.
Inventor:
Grant B. Rossman
Attorneys.

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 13.
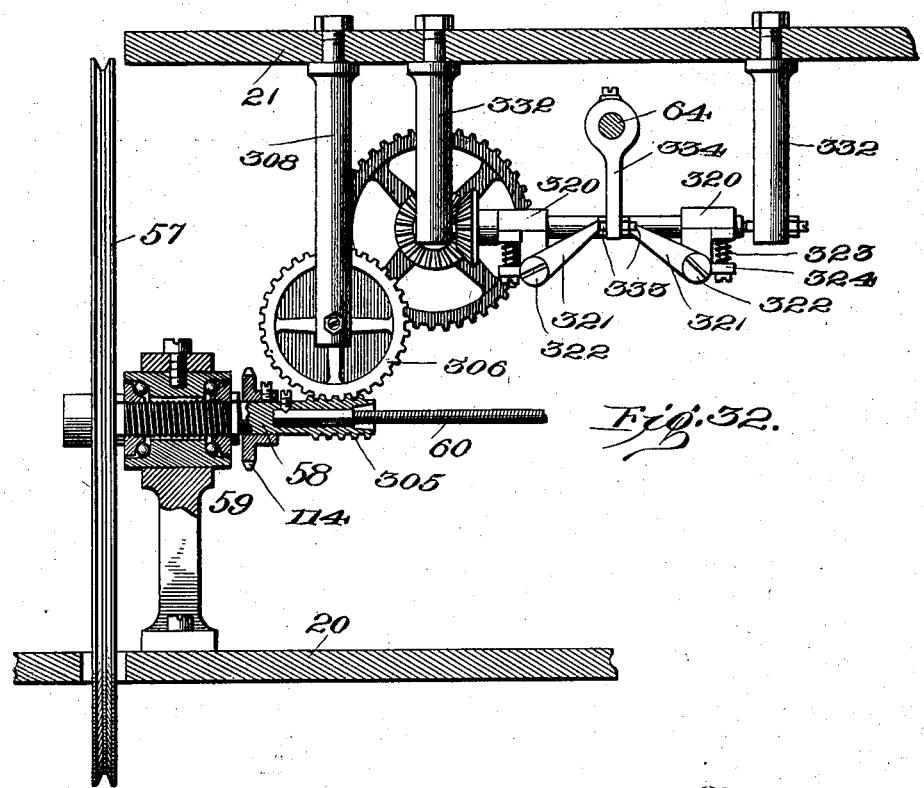
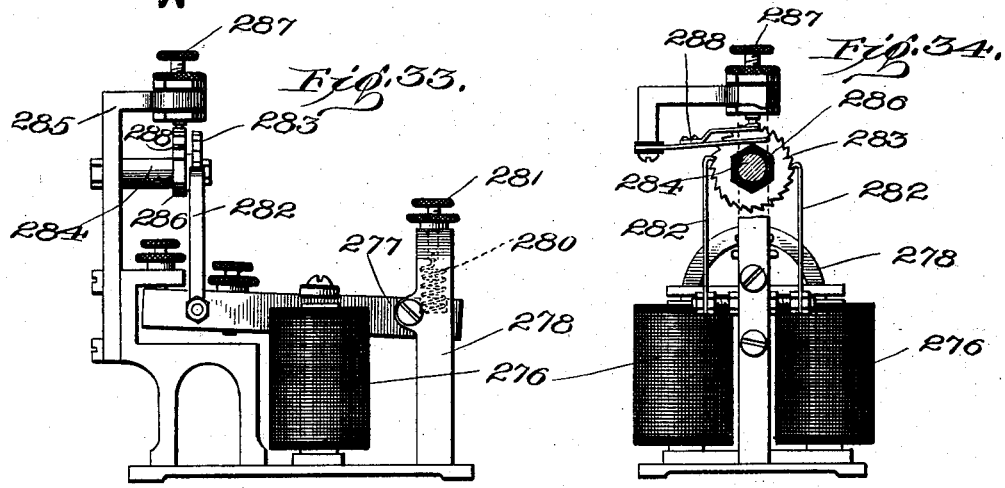

No. 742,065. PATENTED OCT. 20, 1903.
G. B. ROSSMAN.
METHOD OF DEVELOPING, RECORDING, OR TRANSMITTING
GRAPHIC PROCESSES.
APPLICATION FILED JAN. 12, 1903.
NO MODEL. 14 SHEETS—SHEET 14.

Fig. 35.

Witnesses:
Allan Fowe
M. E. Hall

Inventor:
Grant B. Rossman
by Duell, Meyrath & Wigfield
Attorneys

No. 742,065. Patented October 20, 1903.

UNITED STATES PATENT OFFICE.

GRANT B. ROSSMAN, OF NEW YORK, N. Y.

METHOD OF DEVELOPING, RECORDING, OR TRANSMITTING GRAPHIC PROCESSES.

SPECIFICATION forming part of Letters Patent No. 742,065, dated October 20, 1903.

Application filed January 12, 1903. Serial No. 138,697. (No model.)

*To all whom it may concern:*

Be it known that I, GRANT B. ROSSMAN, residing at New York, in the county of New York and State of New York, have invented certain new and useful Improvements in Methods of Developing, Recording, or Transmitting Graphic Processes, of which the following is a full, clear, and exact description, such as will enable others skilled in the art to which it appertains to make and use the same.

This invention relates to telegraphy; and its object is to provide a new and improved method for developing, recording, or transmitting graphic processes.

The invention consists in the method which in its various essential and supplemental steps will be hereinafter described, and the novel features thereof pointed out in the claims.

This invention is designed to accomplish as to some features thereof various objects which it has before been attempted to accomplish by means of various devices which have been termed "telautographs," "writing-telegraphs," &c., all of which may be classed under the head of telegraphs autographic.

Within the scope of the invention are included the production or reproduction of cartoons, sketches, maps and drawings, manuscripts, paintings, &c.

The method may best be described in connection with the geometric telegraph or tracer illustrated in the accompanying drawings, which I have invented as one means of carrying out my method, said geometric telegraph being specifically claimed in a companion application of even date with this application. I believe both the art or method and the means for performing that method to be broadly new.

Operatively the art comprises the control by telegraphic means of an instrument or series of instruments, which may be individually termed "geometric tracers," and the operation of those instruments under such control. The control of this instrument is of an exceedingly elementary character and lends itself readily to a great variety of telegraphic means already existing. The telegraphic elements of the process may be fulfilled with more or less facility by any means whereby intelligence may be transmitted to a distance. Such means are the ocean-cables, land-lines, and various systems of wireless telegraphy and telephony.

The geometric tracer is provided with a tracing-point, which may be a pen, pencil, brush, stylus, etching or engraving tool, or similar implement. Universal movement for this point upon a surface suitable for receiving a record is secured by its situation at the end of a rod which is restrained by guides that allow it freedom of motion in the direction of its length, while the guides have themselves freedom of motion transverse to its length. Independent means are provided for imparting motion to each of these elements—*i. e.*, to the rod and to its guide. The path of the tracing-point upon the surface on which it rests is a resultant of the motion imparted to the guide in composition with the motion imparted to the rod. The direction of the path of the tracing-point is determined by the relative velocities of its two component motions. Where it is desired that this point may have the choice of an infinite number of directions, an infinite number of ratios in the component velocities is requisite. The independent sources of motion for the rod and the guide are in each case a variable-speed device in which a unit velocity derived from a common source may be varied in a continuous series of velocities to zero and through zero by a series of velocities opposite in direction to an opposite unit velocity. Moreover, by suitable means the velocity at any desired phase of the series becomes constant. The value of the ratio of a velocity in one device to a velocity in the other may be anything from zero to plus or minus infinity. Plus infinity, for example, is the value of the ratio when any positive velocity in one device is compared with zero in the other. It is further desirable that the velocity of the resultant be not varied by variation in the value of the ratio of the components—*i. e.*, that speed of tracing be unaffected by direction. The necessary velocity from each device to be communicated, respectively, to the rod and to the guide in order that a resultant of a required direction may be obtained is ascertainable from an empirical law of the composition of velocities. Where two velocities are developed in directions transverse to each other, the ratio of the component velocities reappears in the ratio of the cosines of the complementary angles formed by the inclination of the resultant to the direction of the components. Since the angle's own sine is the equivalent of the cosine of its complement, it follows that an equivalent expression of this law is: If a velocity proportional to the cosine of an angle be compounded at right angles with a velocity proportional to the sine of the same angle, that angle will appear as the inclination of the resultant to the given component. In this law also is the solution of the problem of constant resultant velocity, for if two velocities proportional to the sine and cosine of an angle be compounded at right angles the resultant will be proportional to a constant—viz., the radius of the measuring-arc. The maximum value of sine or cosine equals the radius. To this the unit velocity of the variable-speed device corresponds.

In obedience to the laws stated one speed device is adapted to variation as the sine of an angle and the other device to variation as the cosine of the angle. In each case the device from which the variation is derived is a rod moved in simple harmonic motion by the rotation of a crank. The rod has freedom of movement in the direction of its length, which is parallel to a diameter of the circle in which the crank rotates. It carries perpendicular guides in which a pin at the end of the crank plays freely in the direction of their length. That element of the motion of the crank perpendicular to these guides is communicated by them to the rod on which they are carried. This element of the motion of the crank varies as the sine of an angle through which the crank turns from that position which is parallel to the guides and as the cosine of the angle to that position of the crank which is perpendicular to the guides. These facts enable the control of the speed devices to be made by a single means. The paths of the two rods movable in harmonic motion are made parallel, and the cranks are placed in quadrature—i. e., at a distance of ninety degrees. The cranks—one in its initial position parallel to the guides, the other parallel to the rods—are fixed to the same axis of rotation. Any angular movement of the axis will produce in the two rods motion proportional, respectively, to the sine and cosine of the angle through which the shaft is rotated. To the rods thus constrained to movement in simple harmonic motion is delegated the variation of the velocities developed in the speed devices, the fact to be especially borne in mind being that the distance each rod moves from its initial or middle position is proportional to the sine of the angle through which its crank on the controlling-axis is turned.

A great variety of variable-speed devices may when controlled by the harmonic rod be adapted to furnish the desired velocity ratios.

In general, methods of speed variation in a machine fall into two classes. One varies the power supplied, the leverage remaining constant; the other varies the leverage, the power remaining constant.

An example of the first method, in which the variation would follow the principles of the geometric tracer, is an electric motor in which the strength and direction of the current are controllable by the harmonic rod and proportional to its movement. In general, any device in which the strength and direction of the power are capable of a series of variations is adaptable to the purpose.

Speed variation by the second method—i. e., the variation of the leverage while the power remains constant—is especially suited to the purposes of this instrument, where very little power is required and where certainty and continuity of velocity ratios is desirable.

A simple form of variable-speed device from which the desired series of velocities may be obtained is a friction-gear consisting of a disk wheel and traversing pulley in which the movement of the pulley across the face of the disk is made either equal or proportional to that of the harmonic rod. The velocity and direction of rotation of the driven pulley depend upon its distance and direction from the center of the disk wheel. Similar results may be obtained from friction-cylinders by varying the direction of their axes. Various conical gears are also mechanical equivalents for this purpose.

The magnetic friction-gear shown in the accompanying drawings is especially adapted to meet every requirement of the curve-tracer. As embodied in one form a follower or driven member is a cylinder of uniform radius. The driver is a segment of a sphere which rotates about a radius of the sphere as an axis, the axial radius being central to the segment. Suitably-arranged electric coils make the cylinder magnetic with a consequent pole midway of its length. The driver is also magnetic and is held against the face of the cylinder with a pressure proportional to the strength of the magnetic field. This pressure or pull being self-contained is not communicated to the journals of either the follower or the driver, where it would result in a detrimental friction. The segment rotates with a uniform angular velocity. The linear velocity of any point on its surface varies as its perpendicular distance to the axis of rotation, the velocity of a point in the line of the axis being zero and the maximum velocity being that at the circumference of the segment. By rolling the segment upon the cylinder in the direction of the length of the latter the strength of the driving radius may be varied from zero to a maximum limited by the diameter of the segment. Two series of velocities opposite in direction are of course obtainable from opposite sides of the segment. This rolling motion of the driving member is obtained through its connection with the harmonic rod, which in turn is controlled by the crank and crank-shaft. Since the amount of rolling motion of the driving member with reference to the driven cylinder determines the velocity at which the cylinder is driven, it follows that the velocity of the cylinder is also proportional to the distance through which the harmonic rod is moved. In short, there is provided a shaft bearing two cranks, the rotation of which through any angle moves two harmonic rods through distances proportional to the sine and cosine of that angle. The harmonic rods vary the radius of the drivers in two-speed devices in the same sine and cosine proportion. The motion of the driven member of each device is independently communicated to one of two transversely-movable members of a movable system of guides. The motion of the guides is compounded in the motion of a point carried by them, and the inclination of the path of the point to the direction of one of these guides is the angle through which the shaft was turned. The extent and direction of the rotation of this shaft are determined by a step-by-step device under telegraphic control. A similar step-by-step device regulates the prime mover and determines the velocity and extent of tracing. This controlled system lends itself to use in connection with diplex and other telegraphic lines, inasmuch as the telegraphic problems of repeating, automatic relaying, &c., therefore present no obstacles.

The embodiment of this invention as illustrated in the drawings will now be understood.

Figure 2:
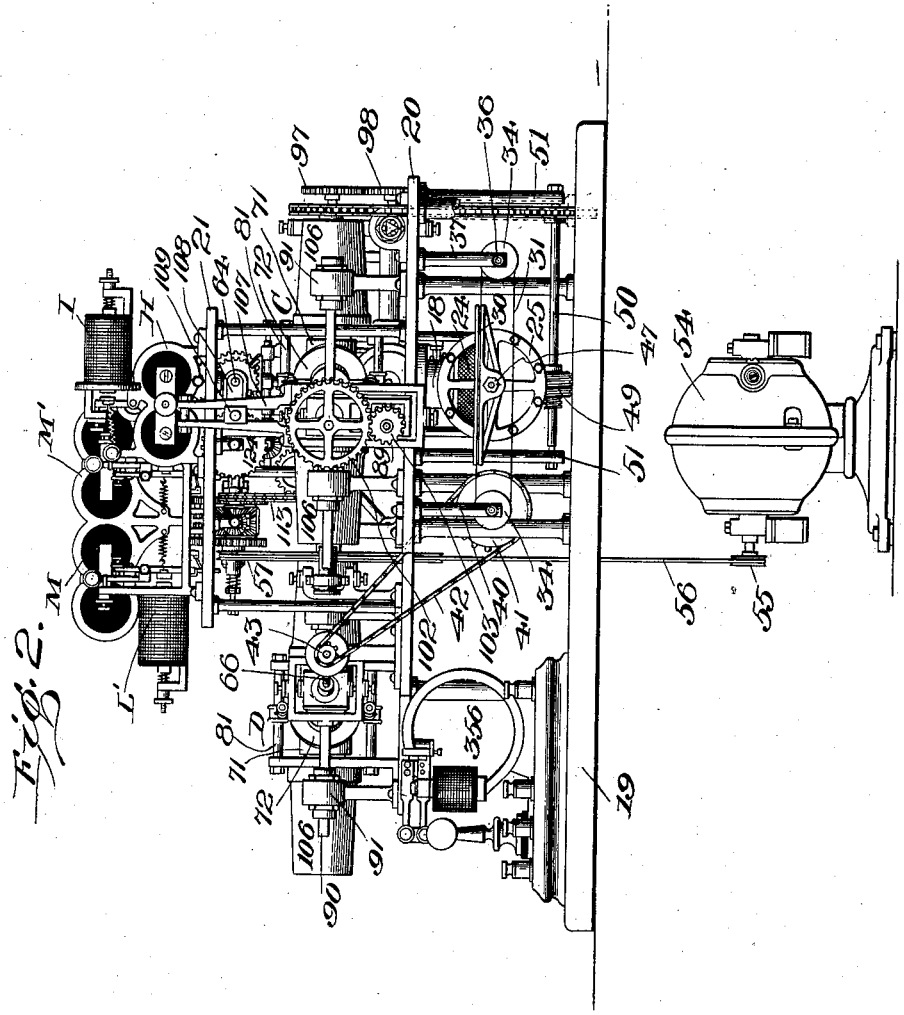
Figure 3:
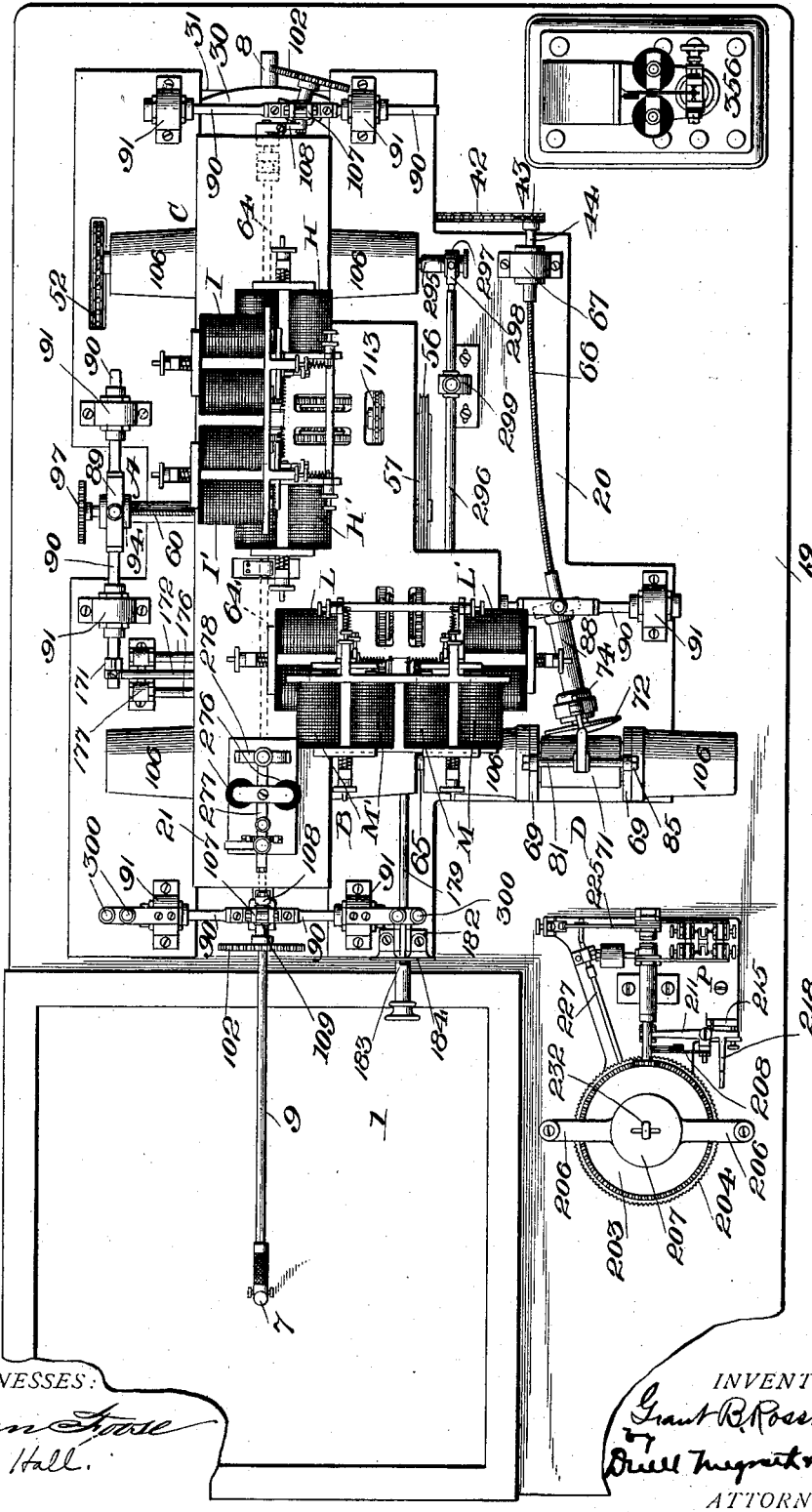
Figure 4:
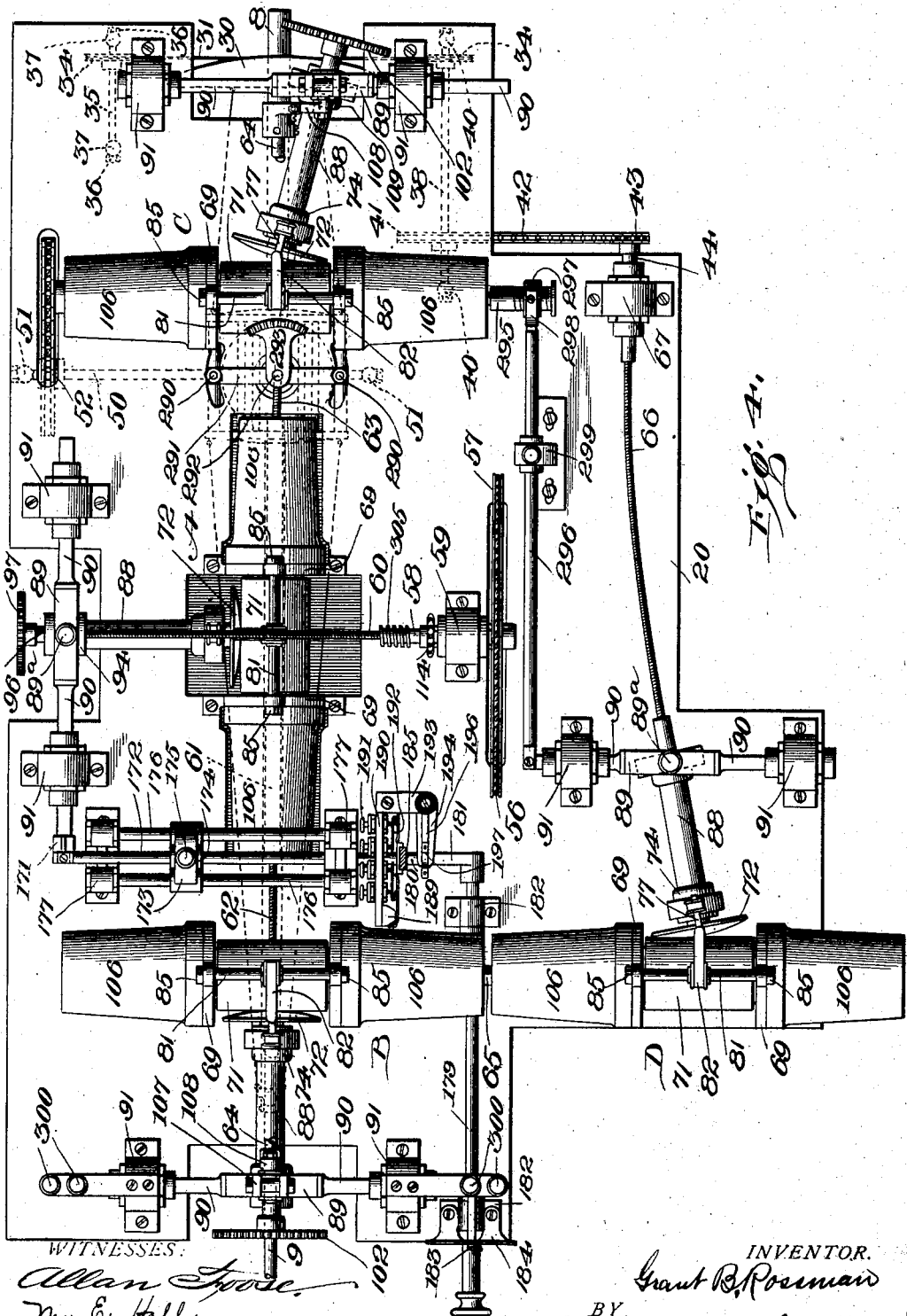

In the drawings, Figure 1 is a side elevation showing a geometric tracer or receiving instrument, a conventional motor for supplying power to said receiver, and a transmitter. Fig. 2 is an end elevation of the same. Fig. 3 is a top plan of the same. Fig. 4 is a top plan view, on an enlarged scale, with the upper deck of the machine removed in order to illustrate more clearly the parts beneath. Fig. 5 is a longitudinal vertical section of the pen-arm, showing the means for controlling the vertical position of the pen and certain elements of the means for actuating the pen-arm. Fig. 6 is a top plan view of the parts shown in Fig. 5. Fig. 7 is a view, on an enlarged scale, on the line R R of Fig. 5, looking in the direction of the arrow and showing the means for guiding the reciprocating element of the pen-arm. Fig. 8 is a transverse section on the line S S of Fig. 5. Fig. 9 is a sectional detail of the pen-holding tube. Fig. 10 is an end view of one of the variable-speed devices, the harmonic rod, and the controlling means therefor. Fig. 11 is a top plan view of the parts substantially as they appear in Fig. 10. Fig. 12 is a detail, partially in elevation and partially in section, of certain features of the variable-speed devices. Fig. 13 is a sectional view taken through the center of one of the variable-speed devices, parts being shown in end elevation. Fig. 14 is a detail, partially in end elevation and partially in section, looking from the right of Fig. 13. Fig. 15 is an end elevation looking from the left of Fig. 14, showing the bearings for one end of the guide-rod. Fig. 16 is a detail, partially in plan and partially in section, showing the angle-changing shaft with the means for actuating it and the speed-changing shaft with the means for actuating it. Fig. 17 is a sectional view, on an enlarged scale, of certain of the parts shown in plan in Fig. 16. Fig. 18 is a perspective of certain of the parts shown in Fig. 17, showing also portions of the escapement device by which the angle-changing shaft, which is normally under tension, may be released in order to allow such shaft to rotate. Fig. 19 is an elevation of one of the sets of escapement mechanisms and the electromagnets by which it is controlled. Fig. 20 is an elevation at right angles to the view of Fig. 19, showing substantially the same parts. Fig. 21 is a sectional elevation of a part of the speed-varying means for one of the variable-speed devices. Fig. 22 is a side elevation of the parts shown in Fig. 21 looking from the left. Fig. 23 is a sectional detail on the line X X of Fig. 21. Fig. 24 is a sectional view on the line Y Y of Fig. 22 with certain parts beneath omitted. Fig. 25 is a top plan view of the transmitter. Fig. 26 is a view of the same, partially in section and partially in side elevation. Fig. 27 is an end elevation of the same. Fig. 28 is a sectional detail on the line Z Z of Fig. 25. Fig. 29 is a view, on an enlarged scale, partially in section and partially in elevation, of certain elements of the unison device. Fig. 30 is a top plan of the same. Fig. 31 is a perspective detail of a spring-controlled stop constituting an element of the unison device. Fig. 32 is an end elevation, partially in section, taken at right angles to the view of Fig. 28. Fig. 33 is a side elevation of an alternating-contact device forming an element in the control of the lifting of the pen-arm. Fig. 34 is an end elevation of the same. Fig. 35 is a diagrammatic view showing the wiring diagram or circuits as embodied in the general system.

Similar reference characters refer to similar parts throughout the several views.

Practically a complete set of instruments comprises a transmitting instrument and a receiving instrument at each end of the line. While the transmitter at one end of the line is being operated to send signals into the line and to the receiving instrument at the other end of the line, the instrument at the transmitting end of the line, which is controlled by the same circuit, would act merely to record graphically the operations of the transmitter for the guidance of the operator. Theoretically of course the line would be complete when equipped with a transmitter at one end and a receiver at the other.

*The receiver.*—The receivers, embodied at any point of the line, are alike. A platen upon which the motions of the pen-arm are recorded may be provided with any suitable surface adapted to receive impressions or capable of recording or characterizing the movement thereof, as passing over a series of contacts, transmitting-keys, or the like. In the present instance it is shown, as in Figs. 1 and 3, as comprising simply a paper-holding table 1, adapted to be adjusted by leveling-screws, one of which is shown at 2. The size or character of this platen is determined only by practical considerations, since it is theoretically unlimited. The penholder, which is adapted to have universal movement over the surface of the platen, is pivotally carried at the end of a reciprocable pen-arm. This penholder comprises a member 3, Fig. 5, which is pivotally mounted at one end within the outer end of the pen-arm and which carries at the other end a short internally-threaded tube 4, in which is carried the pen-holding tube 5, which is provided with external screw-threads throughout a portion of its length in order that it may be adjusted by screwing down into the tube 4. Further adjustment of the reproducing member proper, which in the present instance is shown as a lead, is provided for by making the lower end of this tube internally threaded, so that the lead may be adjusted with relation thereto by screwing it up or down within the tube. The lower end of this tube is split by a series of vertical kerfs extending from the lower end up toward the point at which the tube is externally threaded and adapted to be compressed in order to clamp the lead by a clamping-sleeve 6, which is threaded at its upper end to engage the external threads on the tube. The upper end of the tube may be provided with a knurled head 7 for convenience in adjusting.

It will be seen upon inspection of Fig. 9 that the internal threads on the lower end of this tube have their bottoms flush with the interior wall of the tube, so that the lands of the thread are raised above said inner wall. This gives a better grip upon the lead when it is in position within the tube and at the same time allows the lead to be turned up or down easily within the tube as it is worn off without having resistance offered to such turning by contact of the lead with the walls of the tube above the threaded portion thereof.

The pen-arm comprises a swinging sleeve 8 and a rod 9, reciprocably mounted within said sleeve, which carries at its outer end the penholder proper, already described. As shown in Figs. 5 and 7, there is provided at the forward end of the sleeve a spring-arm 10, adapted to be adjusted by a set-screw 11, and carrying a roller 12, which acts to guide the reciprocable pen-arm, which throughout a portion of its extent is tubular. In lugs 13, projecting from the end of the sleeve, there is journaled a roller 14, which engages with the lower side of the tubular arm and coöperates with the upper roller in guiding said arm. One or both of these rollers may be provided with an annular flange which passes through a slot in the tube in order to assist in guiding and steadying the motion of the arm. A flange is shown at 15 in connection with the lower roller and a slot 16 in the pen-arm. The rear end of the reciprocating pen-arm is formed with flat sides 17 and with a groove in its top in order to provide suitable bearing-surfaces for ball-bearings, by which it is adapted for free movement within the sleeve. This sleeve 8 is pivotally mounted on a support in the form of a cylinder 18, which depends from a platform 20, raised above the base and suitably supported therein, which for convenience and to differentiate it from the base 19 and from the upper platform or deck 21 may be termed the "second" deck and is provided around its lower periphery with a groove 22, coöperating with adjustable cone-nuts 23 23 to furnish a raceway for its ball-bearings. These cone-nuts are screwed down into an internally-threaded socket 24, which is rigid with the sleeve 8. The sleeve may also be provided with a cage formed of webbed side members 25 25 and cross-bars 26, which will serve to steady the swinging movement of the sleeve and assure freedom from vibration by the provision of guy-wires 27, connected at one end to eyes 28 at the outer ends of the sleeve and at the other to adjustable hook-bolts 29 in the cage. At the rear end of the sleeve and rigidly connected therewith is a grooved segment 30, around which pass the ends of band 31, which ends are suitably connected to the rear of the segment 32 with interposed springs 33, if desired. This segment is struck on a curve the center of which is at the pivotal center of the swinging sleeve 8, this being the preferable construction for obtaining uniformity of swing in all positions of the arm. The band 31 passes also around two pulleys 34, as shown in Fig. 2 and in dotted lines in Fig. 4. Thus it will be seen that when one of the pulleys 34 is rotated the segment and sleeve will be swung from the pivotal center, the sleeve carrying with it the pen-arm, whether in an extended or retracted position. One of these pulleys is mounted upon a shaft 35, which is supported by means of threaded adjustable dead-centers 36 in hangers 37, projecting downwardly from the second deck, while the other pulley is mounted upon the shaft 38 between the two hangers 40. This shaft 38 carries also a sprocket-wheel 41, driven by a chain 42 from a sprocket 43 at the end of a shaft 44.

The reciprocable element of the pen-arm is controlled by means of a cord 45, one end of which is connected at any desired point, as at 46, intermediate the length of said arm, and the other end to an adjustable nut 47 upon the outer end of the arm. This cord passes over two guide-pulleys 48, situated at the pivotal center of the arm, and around a spirally-grooved pulley 49. Upon rotation of pulley 49 the cord will be wound in one direction or the other and the pen-arm extended or retracted, as the case may be. The pulley 49 (best shown in Fig. 2) is mounted upon a shaft 50, journaled in dead-centers from hangers 51, depending from the second deck, a spline and feather connection therebetween being provided. The shaft 50 is driven by means of a chain 52 and a sprocket 53 from a shaft in connection with one of the variable-speed devices.

*General transmission of velocity.*—Inasmuch as the velocity element of the power supplied by the motor is the more important from the standpoint of this invention the power element may be neglected and the term "velocity" will be uniformly used throughout this specification.

The power or velocity is supplied by a motor 54, which may be of any desired type. Its driving-shaft is equipped with a grooved pulley 55, over which passes a band 56, by which is driven a grooved pulley 57, carried at the end of a shaft 58, suitably journaled at one end, as at 59, on the second deck and continued in the shape of a flexible shaft 60, which carries at its end a spur-gear, meshing with a spur-gear on the driving member of a variable-speed device, (designated generally by A.) The motor 54 is constantly driven, but the velocity supplied therefrom to the receiver is regulated by the variable-speed device A. This variable-speed device may in itself be considered as a motor developing a variable velocity, and it will hereinafter be called the "velocity-supplying" variable-speed device. This term is applicable, since the driven shaft 61 of this variable-speed device (shown in dotted lines in Fig. 4) is extended in the shape of two flexible shafts 62 63, one at each end of the machine, which carry spur-gears, by which are driven the driving members of two additional variable-speed devices B C. These additional variable-speed devices are controlled in accordance with the sine and cosine law from the main crank-shaft 64 of the instrument, and the guides of the driving-segments are, in effect, harmonic rods. These variable-speed devices B and C will, accordingly, hereinafter be termed the "harmonic" variable-speed devices. The shaft 65 of the variable-speed device B is continued and supplied velocity for an additional variable-speed device D, the driving and driven members of which are in reverse order from that of the other variable-speed devices. The shaft of the driven member of this variable-speed device is extended in the form of the flexible shaft 66. This shaft has a feather-and-spline connection at its end with a stud-shaft 44, journaled on the second deck at 67 and carrying at its end the sprocket 43, from which through the intermediate means described a swinging movement is given to the pen-arm. The shaft of the other harmonic variable-speed device C drives, by means of a chain-and-sprocket connection, the shaft 50, upon which shaft is the spirally-grooved pulley 49, the rotation of which reciprocates the pen-arm, as already described. It will accordingly be seen that the velocity derived from the motor is under the control of the variable-speed device A, and from said variable-speed device it is transmitted in two separate paths, one through the variable-speed device B to the swinging or transverse element of the pen-arm and the other through the variable-speed device C to the extending element of the pen-arm, the two velocities being compounded at the recording-point.

*The variable-speed devices in detail.*—It will now be necessary in order to understand the means for applying the theory already laid down that the construction of the variable-speed devices should be specifically set forth.

The four sets of variable-speed devices shown in Fig. 4 are alike in principle, the main difference being in the means for varying the relation between the driving and the driven members. In the case of those shown at B C the relation of the driving and driven members is varied by rotation of the main crank-shaft 64 and the connections between the cranks and the guide-rods of the driving members, whereby the movement of these guide-rods in shifting the position of the driving member is a movement following the laws of simple harmonic motion. In the case of the variable-speed device D, which acts merely as means for the transmission of velocity from the driven shaft of the variable-speed device B, a means is provided for varying the relation between the driving and driven members in order to compensate for the varying lengths of the reciprocable pen-arm, which would otherwise modify the effect of the transverse or swinging element. In the case of the variable-speed device A, from which power is supplied to the two harmonic variable-speed devices, a means for changing the relation between the driving and driven members is provided in order to vary the speed of tracing to bring it to zero or to reverse the direction, and for this purpose one of the guide-rods of the driving member is connected to a system of levers, by the action of which, as controlled by signals sent through the line, any desired relation between the driving and driven members may be obtained.

One of the harmonic variable-speed devices is illustrated in detail in Figs. 10 and 11 and the velocity-supplying variable-speed device A in Figs. 12, 13, and 14.

Referring first more especially to Figs. 12, 13, and 14, a shaft 61 is mounted by means of ball-bearings held in place by an adjustable cone-nut 68 in supports 69, which are mounted upon the second deck. Carried either integral with this shaft or drive fitted upon annular flanges 70, projecting therefrom, is a cylinder 71 of uniform radius, which constitutes the driven member of the couple. The driving member is in the form of the segment of a sphere 72, supported upon the end of a shaft 73, the axis of which is in a radial line of the sphere. This shaft is rotatably mounted near the end in a sleeve 74 by means of ball-bearings held by an adjustable cone-nut 75. Projecting upwardly and downwardly from the sleeve 74 are arms 76, provided with eyes at their ends. These eyes provide supports for the ends of arms 77, the position of the arm with reference to the eye being adjustable by means of the nuts 78, which are screwed onto the arm one on each side of the eye. The other end of the arm 77 carries a pivot-screw 79, held in adjusted position by means of a lock-nut 80. Cross-rods 81 extend between the standards one above and one below the cylinder, and these cross-rods carry guide-arms 82, which are adjustably held thereon by means of the nuts 83, said guide-arms being positioned to provide pivotal supports for the ends of the pivot-screws 79. For this purpose the guide-arms are provided with longitudinal slots 84, within which the pivot-screws may play back and forth in a plane at right angles to the axis of the driven cylinder, the pivot-screws themselves being in a plane which is tangent to the surface of the driving-segment at its middle point. It will be thus seen that by manipulation of the nuts 78 the arms 77 can be adjusted in the direction of their length, and by loosening the nuts on each side the arms may be rotated for adjustment. The cross-rods 81 may be adjusted by loosening the nuts 85, by which they are held to the supports, and rocking the guide-arms 82 to provide correct pivotal points of support for the driving-segment in order that when rolled upon the driven segment its movement may correspond to the movement of the harmonic rods. A second bearing for the shaft 73 is provided at a point which is at the center of the curvature of the segment in a frame 86, adjustable ball-bearings being provided, as before, by a cone-nut 87, which coöperates with the conical recess formed in the frame. The two bearings of shaft 73 are connected by tube 88. Frame 86 is mounted within an outer frame 89 by means of pivot-screws 89ª, so that it has a free turning movement on an axis perpendicular to the axis of rotation of the spherical segment and passing through its center of curvature. Extending from each side of the frame 89 are guide-rods 90, here shown as triangular in shape and supported by means of ball-bearings within boxes 91 on the second deck, so as to have freedom of motion in a longitudinal direction. These boxes 91 are preferably provided with split bearing-tubes 92, of slightly-resilient material, which are interiorly cylindrical to provide a raceway for the antifriction-balls and which are exteriorly tapered toward their ends. Into the ends of the boxes are screwed locking and adjusting nuts 93, which are interiorly tapered to correspond to the taper of the split sleeve 92, as shown in section at the left in Fig. 14.

In the case of the velocity-supplying variable-speed device shown in Figs. 12, 13, and 14 the shaft of the driving-segment is carried by the frame 86 near the lower end thereof, and at the upper end of said frame there is a box 94, which is provided with suitable cones and adjustable cone-nuts 95 for a short stud-shaft 96, which carries at its end a spur-gear 97, meshing with the spur-gear 98 on the end of the shaft 73. This box may be adjusted relatively to the frame by means of a set-screw 99 and held in adjusted position by the locking-screws 100. The shaft 60, preferably flexible, as shown, forms a continuation of the stud-shaft, and this shaft is driven, as already described, from the motor 54. Both the shafts 73 and 96 are free to move longitudinally with relation to their bearings.

In the case of the harmonic variable-speed devices B C, one of which is illustrated in Figs. 10 and 11, the shaft of the driving-segment is supported at the upper end of the frame 101, and the gear 102, by which it is driven, meshes with a lower gear 103, driven by the flexible shaft 62, which forms a continuation of the shaft of the velocity-supplying variable-speed device. The construction, save for this reversal of planes of the shaft of the driving-segment and the flexible shaft by which it is itself driven, is the same as that of the velocity-supplying variable-speed device.

As shown in section in Fig. 12, the ends of the shafts 61, which carry the driven cylinders of the variable-speed couple, are in each case surrounded by a coil 104, which coils are included in a suitable circuit and so arranged as to provide a consequent pole midway of the length of each cylinder, the cylinder, segments, and shafts being all of suitable magnetic material. As shown, the coils are wound around suitable spools 105 and are protected by housings or caps 106, which have a threaded connection with the supports 69. Any suitable winding or arrangement of coils may be provided, however, which will tend to cause a magnetic pull between the driving and driven members of the variable-speed devices. This magnetic pull is especially important in connection with the present instrument, because although it is necessary to transmit but very little power through the variable-speed devices it is necessary that the transmission of power or velocity should be very accurate and that its variation should follow very closely the variations of the relation of the driving and driven members of the couple. This feature of magnetic increase of moment of friction of the variable-speed device is claimed as such in an application filed by me on September 29, 1903, and is not claimed herein.

The mode of operation of the variable-speed devices in so far as it has not already been described will now be clear. In order to guide the rolling motion of the segment through which the speed variation is obtained, the bearings of its axis (two in number) are so supported as to permit the rotating segment to be rolled upon the cylinder in a direction parallel to the axis of the latter. The supports of the journals are pivots perpendicular to the plane in which the segment is rolled. The axial line of the pivots at the segment end is a tangent to the segment. The pivots rest in adjustable guides that permit them free turning motion and also a motion of translation perpendicular to the axis of the cylinder in the plane of the rolling movement. These guides for a special purpose restrain the point of tangency from any motion of translation parallel to the axis of the cylinder. The axial line of the pivots of a second bearing passes through the axis of the segment at a point coincident with its center of curvature. These center pivots have free turning motion in a frame carried by a harmonic rod. The direction of movement of the rod is parallel to the axis of the cylinder.

It is recognized that the center of curvature of a rolling sphere has a rectilinear path parallel to the plane on which it is rolled and that moving the center a given distance will roll an equal length of arc through tangency to the line on which it is rolled. When the center of curvature is moved through a given distance, a point in the face of the segment at an equal distance from the center measured on the arc is brought into tangency with the cylinder. The restraint, however, to which the segment-pivots are subjected in the direction of the axis of the cylinder draws an additional length of arc into tangency such that a perpendicular let fall from the final point of tangency upon the axis of rotation is equal to the distance through which the center of curvature was moved by the harmonic rod. This perpendicular determines the velocity at which the cylinder is driven, which velocity is accordingly proportional to the distance through which the harmonic rod is moved.

*Crank-shaft and escapements.*—Each of the harmonic variable-speed devices is provided with guides through which the motion of the harmonic rods is obtained from the cranks 108, which are carried one at each end of the main crank-shaft 64, extending longitudinally of the machine, and which move in accordance with the law of simple harmonic motion. These guides are in the form of spaced uprights 107, carried by the frame 89. In the space between these uprights plays a sliding cross-head 109 at the ends of the cranks, as best shown in Figs. 1 and 10. The cranks 108 in the present case are set in quadrature or at right angles to each other, in accordance with the theory heretofore explained. It will thus be seen that the crank-shaft through the sliding cross-heads controls the harmonic rods, which are parallel to the horizontal diameter of the circle in which the cross-heads move. The motion of the one is proportional to the cosine and the other to the sine of any angle through which the crank-shaft is turned.

The crank-shaft is supported from the upper deck by suitable hangers 110, as in Fig. 16. It is normally under tension tending to rotate it in either direction through the mechanism most clearly shown in Figs. 16 and 17, wherein 112 is a short horizontal shaft which is driven from the motor, through the shaft 60, by means of a chain 113 and sprockets 114 and 115. This shaft is supported by two hangers 116, depending from the upper deck, and carries at its end a bevel-gear 117, which engages two bevel-gears 118, each carried at the end of a short shaft 119, journaled between dead-centers at 120 121. Loose on the shafts 119 are sleeves 122, which carry spur-gears 123 124, a disk or washer 125 of any suitable frictional material being interposed between the bevel-gears and spur-gears. The sleeves 122 are acted upon by springs 126, which surround shafts 119 and abut at one end against the sleeves 122 and at the other end against nuts 127, threaded onto the shaft, whereby the tension of the springs may be adjusted. It will thus be seen that inasmuch as the shaft 112 is constantly driven the spurs 123 124 will be normally driven in opposite directions because of the frictional contact between the spur-gears and the bevel-gears. One of these spur-gears meshes with a spur-gear 128 on one of the outer members 129 of a differential gear, (designated generally by E.) The member 129 of this differential is supported on the crank-shaft 64 by means of antifriction-bearings, which are supported by collars 130 131, carried with the shaft. The planetary member 132 of the differential is carried with a comparatively long threaded sleeve 133, which is loose on the shaft 64 and provided at one end with ball-bearings in connection with the collar 131 and at the other end in connection with a collar 134. The second outer member 135 of the differential E, which carries a spur-gear 136, meshing with the spur 124, is rotatably mounted upon the sleeve 133 by means of ball-bearings and the adjustable cone-nuts 137. The outer end of the sleeve 133 is provided with a bevel 138, which forms one of the members of a second differential gear F, the planetary member 139 of which is rigid with the crank-shaft 64 and the other member, 140, of which is at the end of a sleeve 141, rotatably supported about the crank-shaft and provided with ball-bearings thereon with cone-nuts 142. This sleeve is also mounted upon antifriction-bearings within a hanger 143, depending from the upper deck, and it carries at this outer end, either rigid therewith or fastened thereto by a set-screw, as shown, a bevel-gear 144, which forms a part of a rectifying device, the object of which will appear later. It will be seen that by this construction as the shaft 64 is rotated if all the parts were free to move both outer members of the first differential E would be driven. If the respective rates of speed were suitable, the planetary member 132 would be rotated thereby, carrying with it the sleeve 133, the outer member 138 of the second differential, and the planetary member 139 of this differential, thus causing the rotation of the crank-shaft. The action of the outer member 140 of the second differential may be neglected for the moment, inasmuch as its action is in any event merely to modify or to cause a slight rotation of the crank-shaft. The crank-shaft, which is in this way under constant tension, tending to drive it in either direction, is caused to respond to the signal sent over the line and allowed to rotate in the desired direction by means of magnetic escapement devices which control the action of the first differential E. These escapements are best illustrated in Figs. 18, 19, and 20. Short shafts 145 are journaled in the frames 146, supported on the upper deck. The escapement devices and the means for controlling the differentials are throughout in pairs and a description of one of the members of each pair will suffice for both, except where it is otherwise stated.

The shaft 145 carries a spur-gear 147, which projects through an opening in the upper deck and engages a spur-gear formed on one of the outer members of the first differential E, near the top thereof. The end of this shaft carries a ratchet-wheel 148, which is normally engaged by the fast dog 149 of an escapement-lever 150, which is pivotally mounted on the frame 151, and the differential member is held from rotation by the engagement of the gears 147 136. Mounted above the upper deck are two pairs of electromagnets, which may be designated H H' I I'. The poles of these magnets are housed in the frames 146 151, which are suitably formed for that purpose, and their keepers 152 are held under spring tension by the springs 153, adjustable by means of the nuts 154. The lever 150 is connected to the armature 155 of one of the lower pair of electromagnets, as H. This lever 150 is normally under spring tension by means of the springs 156, connected to it and to a pin 157, projecting from the frame, so as normally to retract the armature from its magnet and to pull the fast dog 149 into engagement with its ratchet. The loose dog 158 is pivoted at the end of an arm 159, projecting from the lever 150, and is under spring-pressure, tending normally to hold it raised and away from the fast dog. The loose dog is forced down by the action of the rotating escapement after the fast dog has been withdrawn from contact with the escapement-wheel by the energizing of its electromagnet H and the loose dog has been drawn into contact with the next succeeding tooth thereof. On the deënergizing of the electromagnet H the retractile spring 156 slides the loose dog out of and the fast dog into engagement with the ratchet-tooth, restoring the normal condition. Thus it will be seen that each time the armatures of the magnets H H' are attracted by the energizing of the magnets, the escapement-wheels will be allowed to rotate the distance between successive teeth and the crank-shaft, though the described mechanism will be rotated through a given angle, thereby actuating the harmonic rods and varying the velocities which are transmitted to the reciprocable and transverse elements, respectively.

It will be seen in Fig. 18 that the loose dog of the escapement devices at the left contacts with the lower side of the fast dog and is under normal spring tension to hold it down, while the loose dog at the right is spring-held upwardly and contacts with the upper side of the fast dog. These changes are necessary because of the reverse rotation which is intended to be permitted the crank-shaft; otherwise the escapement devices are the same.

The upper end of the escapement-lever 150 is pivotally mounted between dead-centers 160, carried by lugs projecting from the head 161 of an inverted-T-shaped member the vertical leg 162 of which is pivoted between its ends to the frame on the stud 163, which projects from the frame and passes through a sleeve 164, formed in connection with said vertical member. The upper end of this vertical member carries the armature 165 of one of the upper set of magnets I, and it is normally retracted from said magnet by means of a spring 166, connected to a pin 167 on the frame. The normal positions and tensions of the various members may be adjusted in any desired way, as in connection with the lever carrying the armature of the lower electromagnet, by extending said lever beyond its pivot and supplying it with an adjusting-screw 168, contacting with any suitable abutment, which is in this case the vertical member of the frame to which said lever is pivoted. The main lever 162 is likewise adjustable by means of a set-screw 169, passing through a right-angled arm of the frame 170 and bearing against the end of the lever 162.

When the armature 165 of the upper magnet I is attracted by the energizing of said magnet, the main lever 162 will be rocked about the stud 163 and the lower part of the compound escapement mechanism will be carried away from the ratchet, releasing said ratchet from both the fast and loose dogs. This is done at suitable times, as will hereinafter appear, when it is desired to relieve the crank-shaft entirely from the control of the escapement mechanism and allow it to rotate freely in either direction until stopped at a suitable point by checks placed in its path, simultaneous with which the magnet is deënergized and the escapement device is restored to its normal condition under control of the lower magnets. The direction of rotation thus permitted the crank-shaft would, of course, depend upon which of the magnets I I' was energized.

*Means for regulating the speed of tracing.*—As has already been stated, the speed at which the pen is moved—that is, the absolute values of the transverse and extending elements of the ratio—may be simultaneously varied, as desired, without changing the ratio, the direction in which a line is drawn may be reversed, or the pen may be brought to a full stop by regulating the velocity-supplying variable-speed device A. More specifically, rolling the driving-segment upon its cylinder will change the absolute speed. Throwing this driving-segment from one side to the other of its axis will reverse the direction of rotation of all the speed devices, and consequently the direction of any line being traced, and throwing the driving-segment to center, or so that its axis is perpendicular to the axis of the cylinder, will produce zero speed and stop the pen. The mechanism by which this is accomplished is best shown in Figs. 21 to 24, inclusive. At the end of one of the guide-rods 90, connected to the journals of the shaft 73, is fastened a lever 171, which is in turn connected to one end of a swinging lever 172, pivoted in a movable fulcrum 173. The distance through which the lever 171 will be moved by a given movement of the opposite end of the lever 172 will depend upon the position of this fulcrum, and this can be adjusted in the following way: The lever 172 is provided with a loose sleeve 174, which is pivotally mounted by means of screw-points 175 in the fulcrum-frame. This frame is mounted upon guide-rods 176, supported at their ends in standards 177, said guide-rods passing through bearings formed in connection with the frame, so that the frame is free to slide upon said rod. Connected to the frame is a rod 178, which is slidably supported in one of the standards 177 and is moved longitudinally, carrying the fulcrum-frame with it, by throwing a rock-shaft 179, to which the rod 178 is connected by toggle-joint members 180 181. The rock-shaft 179 is supported in suitable bearings 182 on the second deck 20 and may, if desired, be provided with an index-finger 183, which follows the movement of the rod and reads upon a scale 184.

As shown in Fig. 24, a swinging arm 185 is connected to the end of lever 172, this arm being connected and carried by a shaft 186, acted upon by the speed-changing escapement. The connection between levers 171 and 172 is a fixed connection. The necessary looseness of parts to provide for the proper movement of the rod 90 is provided through the looseness of the sleeve 174, as described above, and by a loose connection between the arm 185 and the lever 172. This shaft is journaled on dead-centers carried by hangers 187, depending from the upper deck, and it is rotated by the planetary member of a differential gear K, substantially the same as the differential gear E. The outer members of this differential gear are loosely sleeved upon the shaft 186 and provided with spur-gears which mesh with spur-gears of a friction-slip device, similar to the friction-slip device already described, and driven from the shaft 112 through the interposition of a shaft 188. The shaft 186 is thus under tension tending to rotate it in either direction. This rotation is controlled by two pairs of escapement devices L L' and M M', the escapement-shafts of which carry spur-gears meshing with the spur-teeth on the outer members of the differential gears, as before described. It will thus be seen that upon energizing either of the pair of electromagnets L or L' the speed-arm 185 will be thrown in one direction or the other and the lever 172 swung to vary the relation of the members of the variable-speed device.

*Auxiliary contacts.*—Standards 189 are supported on the second deck carrying a cross-piece 190, which is provided with four adjustable contact-screws 191. These screws are in pairs, and in connection with each pair there is a vibrating reed 192, carrying two contacts. These reeds are bent inwardly, as shown, in order that they may be picked up readily by the speed-arm 185, and are placed at a sufficient distance apart such that when the arm 185 is in its central position it will rest between the two reeds. When, however, the speed-arm is moved in either direction, it will vibrate one of the reeds and make the contacts accordingly. An arm 193, projecting from one of the standards, carries a right-angled arm 194, at the end of which is an adjustable contact-screw 195, situated beneath the contact-point of a vibrating reed 196. This reed, as shown most clearly in Fig. 22, has two elevated points 197 on its upper side, with a depression between them, the plane of the points being such that they are adapted to be struck by an adjustable pin 198, passing down through a lug 199, extending at right angles from the speed-arm 185. This construction is such that whenever the speed-arm is one step in either direction from its central position, which corresponds to the zero position of the variable-speed device, it will strike one of the elevations 197 and make the contact at the point 200. Obviously if the arm sweeps across center from either side it will by striking each of the elevations make two contacts in succession.

*Transmitter.*—The transmitter, as shown in Figs. 25, 26, and 27, embodies in general two circuit-controlling devices and an auxiliary pole-changing switch. One of these circuit-controlling devices is operated through the rotation of a toothed disk and the other through the swinging of a toothed segment, while the pole-changing switch through mechanical connections to both circuit-controllers and one auxiliary circuit is adapted to change the polarity of the circuit through the line whenever the direction of movement of the rotary-disk circuit-controller or the toothed-segment circuit-controller is reversed. Each circuit-controller acts under certain conditions to change the position of the pole-changing switch and as a consequence the polarity of the main-line circuit.

In detail a cylindrical support 201 is provided with an annularly-projecting flange 202. The rotary disk 203, which is provided on its periphery with teeth 204, carries either integral therewith or suitably connected thereto a ring 205, having an inwardly-projecting annular flange which coöperates with an outwardly-projecting flange of the support 201 to guide the disk as it is rotated. Suitable handles 206 may be connected to the rotary disk, by which it may be operated, as in the present instance, by connecting the arms of said handles to a tube 207, closed at one end, which tube is connected to the rotary disk. A vibrating reed 208 carries a contact 209 and an antifriction-roller, with which the teeth of the disk 203 engage. An adjustable screw-contact 210, coöperating with the contact 209, is carried at the end of one arm 211 of a lever pivoted on a vertical pin at 212, the reed 208 being secured to a lug projecting from this lever near its pivotal point, as shown at 213. A spring 214 surrounds the pivot of the lever, and one end thereof engages with the arm 211 of the lever, the other end of the spring being secured to a suitable abutment, as at 215, whereby the spring tends normally to throw the lever on its pivot toward the opposing contact. The other arm, 216, of the lever carries a set-screw 217, the end of which engages with abutment 215, whereby the position of the lever under the control of the spring 214 may be adjusted. An arm 218 projects from the outer arm 216 of the lever in suitable position so that it may be conveniently grasped to swing the lever on its pivot against the tension of the spring 214 when desired, thereby carrying the friction-roller on the reed out of operative relation to the toothed disk. The number of teeth on the disk should be properly proportioned with relation to the rotation of the crank-shaft as controlled by the escapement devices already described, so that a given rotation of the toothed disk will cause a corresponding definite angular movement of the crank-shaft. The circuit which is closed by the operation of the toothed disk in throwing the two contacts 209 and 210 together is a local circuit, which through the operation of a suitable electromagnet and armature controls a break in the line-circuit in order to send signals into the line to operate the angle-changing escapements.

Signals are sent into the line to control the speed-changing escapements by the closing of a local circuit at the contact-points 220 221, as shown in Fig. 27. One of these contacts is an adjustable screw-contact supported in a standard 222, to the upper end of which standard is secured a reed 223, carrying at its end the contact 220. If desired, this standard may be provided with an adjusting-screw 224 for adjusting the tension of the reed. An antifriction-roller carried by the reed is adapted to contact with the teeth of a toothed segment 225, pivotally mounted at 226 in a standard uprising from the base, the relation of the parts being such that the swinging of this segment will throw the contacts together. As shown in Fig. 27, the teeth on this segment are in three sets—an upper set of ordinary sharp teeth, a lower set of ordinary sharp teeth, and two central teeth of greater size and having their points cut off, so that their tops are flat, and having a separating-notch between them. The toothed segment 225 is swung upon its pivot by means of a bent lever 227, pivoted at 228 and having its end connected to a bell-crank lever 229, the short arm of which is pivoted at 230 in a lug depending from the rotary disk 203. A vertical arm of this bell-crank lever passes through a slot 231 in the tube 207 and is provided with a suitable knob 232, by which it may be manipulated. This slot is provided near its center with a small tooth 233, projecting into the slot and located opposite a small depression in the other side of the slot 234, as shown in dotted lines in Fig. 25, for the purpose of indicating the central position of the bell-crank lever. This central position corresponds to the position of the toothed segment shown in Fig. 27, such that the friction-roller of the reed rests between the two enlarged blunt teeth. Inasmuch as the lever 227 is pivoted at a fixed point and it is necessary that the bell-crank lever 229, which is pivotally mounted in connection with the rotary disk, should partake of the rotary movement of such disk, a ball-and-socket joint is provided for connecting the bell-crank lever to the end of the pivoted lever 227, whereby the bell-crank lever is free to rotate with reference to the pivoted lever, while at the same time the swinging of the bell-crank lever on its pivot will cause a corresponding swinging of the lever 227. This joint is provided by means of a housing 235, connected to the end of the pivoted lever 227, and provided with a socket in which fits a ball having a pin 236 connected thereto and pivotally connected to the bell-crank lever.

The differential pole-changer (designated generally by P) is provided with forked standards 237, each of which carries at the upper end of its fork a pair of adjustable contacts 238 239. Pivotally mounted between the standards at the point 240, as shown in dotted lines at Fig. 27, is a bell-crank lever the vertical arm 241 of which carries at its upper end four contact-points 242, adapted to contact with the four adjustable contacts on the forked supports. Supported in a suitable bearing on the base, as at 243, is a shaft 244, one end of which carries a spur-gear 245, adapted to engage with a crown-ring 246 on the upper side of the toothed disk 203, whereby the shaft will be rotated as the disk is rotated. On the outer end of this shaft is carried a plate or arm 247, which is mounted on the shaft by means of a friction device, so that it will rotate with said shaft unless the end of the arm is held. This construction comprises a sleeve 248, one end of which abuts against a collar 249, fastened to the shaft, and the other end against a similar adjustable collar 250, with a bent spring-washer 251 between the sleeve and the outer adjustable nut. The end of the arm 247 is slipped over the end of the sleeve 248 and held in position thereon by a nut which forces it against a flange-sleeve. Accordingly the arm 247 is fastened to the sleeve 248 and will be carried with the sleeve as said sleeve rotates with the shaft, owing to the friction-clutch between the sleeve and the shaft caused by the pressure of the spring-washer forcing the end of the sleeve against the collar 249 on the shaft. When, however, the end of the arm 247 is held from motion, the shaft 244 will revolve within the sleeve, owing to the slipping of the frictional connection therebetween.

On the horizontal arm of the bell-crank lever in connection with the pole-changing switch is a bevel-gear 260, which is adapted to engage teeth formed on the inner side of a curved segment 261, carried at the end of the arm 247. A similar tooth and segment engages the opposite side of said bevel-gear, whereby a differential mechanism is produced, such that there is a direct connection between the shaft 244 and the contact-carrying bell-crank lever 241, whereby upon rotation of the shaft in either direction the bell-crank lever will be rocked on its pivot in a corresponding direction until the contacts 242 engage one or the other set of opposing contacts, whereby the motion of the bell-crank lever will be checked, the arm 247 and sleeve 248 will slip upon shaft 244, and any further rotation of such shaft in the same direction will not affect the position of the contacts, while a change in direction of the rotation of the shaft will throw said contacts to the other side. An arm 262 is mounted upon the pivot of the toothed segment 225, so as to form practically an integral extension thereof, and this arm carries at its outer end the short segment 263, having teeth on its inner face adapted to engage the bevel-gear 260. From this construction it follows that the rotation of the toothed segment by the operation of the outer member of the differential will throw the bell-crank lever 241 and the contacts carried thereby in one or the other direction in the same manner as the contacts are thrown by the movement of the first outer member of the differential. Inasmuch as the motion of the toothed segment 263 is limited, it is not necessary to provide any slip between this segment and the member of the differential controlled thereby, such slipping being necessitated in the case of the connection between said differential and the rotary disk because of the greater range of movement of said disk. At the upper end of the segment 263, which is connected to swing with the toothed segment, is fastened one end of a sheet-metal strip 264, the other end of which rests with a slight pressure against the face of the segment 261. This acts as a brake for the movement of the segment 261. Without it the tendency would be upon operation of the differential through one of the segments to cause an opposite movement of the other segment, which would diminish the desired movement of the intermediate member. The brake, however, provides a sufficient friction upon the segment 261 to prevent this action. It will accordingly be seen that the mechanical connection between the two circuit-controllers and the differential pole-changer is such that the operation of one circuit-controller will throw the switch independently of the other circuit-controller, so that the polarity of the circuit at the line may be controlled by either controller without regard to the position or previous action of the other. Moreover, the throwing of the contact-carrying arm of the pole-changing switch is so delicately controlled, because of the differential mechanism interposed, that a very slight movement either of the rotary disk or the toothed segment is sufficient to operate the pole-changing switch, such movement being less than the movement of either controller in causing the vibration of the reeds controlled thereby, and accordingly the operation of either circuit-controller will always be preceded by the throwing of the differential pole-changer unless the said pole-changer is already in a position which corresponds to the movement given to the circuit-controller. The arms 206 206, carrying knobs which are adapted to be grasped by the operator, are preferably arranged on that diametrical line of the rotary disk which is parallel to the line that the pen-point will trace with the crank-shaft which the rotary disk controls in a given position. By this is secured full coördination of the hand and eye of the operator. The direction of the slot 231 is likewise in the diametrical line of the arms, and accordingly the movement of the bell-crank lever to or fro between said knobs determines correspondingly the direction of drawing along the same line.

The number of teeth in the segment at 225 both above and below the blunt teeth correspond with the number of impulses necessary to be sent into the main line in order to carry the variable-speed device by the operation of the variable-speed escapement through its entire range of velocities. The notch in the middle of this segment corresponds to the middle position of the speed-arm 185, and consequently to the zero position of the velocity-supplying variable-speed device. The movement of the bell-crank lever 227 to or from its middle-position results in a corresponding movement to or fro of the variable-speed arm from its middle position, and hence results in the corresponding motion to or fro of the pen-arm in any direction previously determined by the angle-changing elements. It will accordingly be seen that by the direction of movement of the bell-crank lever 229, which controls the position of the velocity-supplying variable-speed device, may be determined the direction of movement of the pen-arm, and if the rotary disk is set so as to obtain a given angle of the cranks on the crank-shaft and a given line of movement for the pen-arm, which line of movement will correspond to the direction of the arms 206 206, then a movement of the bell-crank lever in either direction between those arms will cause a corresponding movement of the pen-arm in the same direction along the given line. The reversal of movement of the bell-crank lever at any point causes a corresponding reversal of direction of the pen-arm at that point, while if the bell-crank lever is brought to center as determined by the depression in the slot the velocity-supplying variable-speed device will be brought to zero and the pen-arm will be stopped. It is obvious that a reversal of direction of tracing in the given line may also be obtained by rotating the angle-changing disk through one hundred and eighty degrees.

By reason of the already-described mechanical relation between the variable-speed arm in the receiver and the electrical contacts controlling the pencil-lifting device, the pencil, normally in its lowered position, is raised by the energizing of the local circuits controlling it and lowered by the next energizing of the same circuits. These circuits are energized whenever the variable-speed-controlling arm is one step off center in either direction. The flat-topped teeth on each side of the center of the segment 225 in the transmitter correspond to the positions in the receiver of the speed-varying arm 185 by which the pencil lifting or lowering circuit is energized. With the pencil normally in contact with the platen it is lifted by making one contact at 197. A second contact made at these points returns the pencil to its normal position. It is apparent that carrying the contact-roller of reed 223 across both blunt teeth would raise and then lower the pen-arm. The pencil in the meantime having ceased tracing by reason of the zero position of the speed device, the line traced would not be interrupted.

As may be seen upon an inspection of Figs. 27 and 35, the making of a single contact at the points 220 and 221 by the swinging of the toothed segment 225 will change the position of the pencil from raised to lowered, or vice versa. There is no fixed cycle of such changes, as the changes depend simply upon alternation of contacts. Then with the parts in the position shown in Fig. 35 if we assume that the pencil is in its lowered position the swinging of the segment until the roller connected to the reed 223 rests upon the top of one of the flat teeth would make the contacts and raise the pencil. If then the segment were swung back so that the roller rested between the two teeth, the pencil would remain in its raised position. If, however, the segment were swung so as to carry the roller to the top of one of the flat teeth, the contact would be made, and if it were swung across the tooth and then back again to central position a second contact would be made, which would bring the parts in the same relative position as before. Accordingly as the parts are shown in Fig. 35 the pencil may be either raised or lowered, and the operation of the pencil-lifting device at any point depends upon alternation of contacts under the control of the operator and not upon a fixed cycle of movements.

To assist in the manipulation of the bell-crank lever 229, with a view to bringing the roller to a rest upon either of the flat-topped teeth, the tooth 233 is provided in the slot 231, which guides the bell-crank lever. Bringing the lever to rest against either side of the tooth will indicate the desired position of the segment, with the friction-roller resting on one or the other of the flat-topped teeth, the speed-arm being correspondingly one step off center and the pencil-lifting circuit accordingly closed at that point.

*The pencil-lift.*—The contacts at the point 197 operate to close a break in a local circuit through which the pencil-lift is operated. As seen most clearly in Fig. 5, a wire 270 is connected at one end to the upright member of the pivoted lever 3 and at the other end to an adjustable nut 271 in connection with the reciprocating arm which carries the pen. A spring 272 acts upon the pivoted lever 3 in opposition to the wire. This wire near its center is adapted to be drawn upwardly in order to swing the pen-holding lever on its pivot and draw the pen, pencil, or other reproducing point away from the paper in the following manner: The wire passes through eyes in three guides, the outer ones of which are fixed. The central one of these guides forms the continuation of a rod 273, which passes up through the center of an electromagnet 274. This rod is threaded at its top and provided with a nut for the purpose of adjustment and is connected to the armature 275 of the electromagnet. Thus upon energizing of the electromagnet and the attraction of its armature the guide, through the eye of which the wire passes, will be drawn upwardly, tightening the wire and lifting the pencil, and upon the deënergizing of the magnet the pencil will be again lowered to operative position. As will be seen more clearly from the diagrammatic view hereinafter described, the magnet 274 is in a local circuit, a break in which is under the control of the mechanism shown in Figs. 33 and 34, said mechanism being in a circuit a break in which is controlled by the swinging arm 185 making the contact at the points 197, as already described. This mechanism, as here shown, comprises a magnet 276, supported upon the upper deck, and having an armature 277 pivoted on a pin extending between the uprights of a U-shaped standard 278, rising from the base. This armature is normally held raised by means of a spring 280, (shown in dotted lines in Fig. 33,) which bears against the outer end of said armature beyond its pivot and which is controlled by a set-screw 281 passing through the upper part of the standard. The outer end of this armature carries two pawls 282, which engage one on each side of a ratchet 283, loosely mounted on a stud 284, projecting from a standard 285. Connected to this ratchet and rotating with it is a hexagonal nut 286, of suitable insulating material. A horizontal arm of the frame carries above the nut an adjustable contact-screw 287, which coöperates with a contact-point on a reed 288, the reed being adapted to be vibrated to throw the contacts together when the hexagonal nut is turned so as to throw one of its points upward.

The number of teeth on the ratchet and the number of sides of the nut should be so proportioned that energizing the magnet once will change the condition of the contacts in accordance with the theory of the pencil-lifting element, as already set forth. In the present instance this is accomplished by the use of a six-sided nut and a ratchet having twenty-four teeth and the armature carrying two pawls for rotating the ratchet. As the armature is drawn down it will rotate the ratchet one tooth through one of the pawls and as it springs back it will rotate the ratchet the same distance through the other of the pawls. In this way a single impulse through the magnet will rotate the ratchet through one-twelfth of its circumference and the nut will accordingly be carried through one one-twelfth of its circumference, or from a point such that the reed rests upon a flat side of the nut and out of contact to a position such that the reed rests upon one of the corners and is in contact or from a corner to a flat side.

*Rectification of swing.*—In the system embodied in the accompanying drawings the component velocities relative to each other are developed in a rectangular and rectilinear relation; but when considered relative to the platen the path in which the swinging element is developed is curvilinear with the pivotal center of the arm at the center of curvature and the velocity of the reciprocating element is developed radially to this center of curvature. The system of coördinates in which the composition of velocities is made is rectangular and rectilinear relative to the swinging arm; but relative to the platen, where the visible record is made, the system while still rectangular is rather a composite of curvilinear and rectilinear. From this it will be apparent that if the transmitter were fixed relative to the pen-arm no special provision would be necessary to preserve the desirable coördination between the hand and eye of the operator, previously explained; but since in the instrument shown in the accompanying drawings it has been found preferable to detach the transmitter from the pen-arm and place it in fixed relation to the platen it is desirable to provide means whereby the composite system of coördinates is automatically converted in the visible record into a rectilinear system, thereby preserving the coördination between the operations of the transmitter and the visible record of the platen. This result, briefly stated, is secured by automatically communicating to the crank-shaft any angular movement of the pen-arm. The means for accomplishing this are shown in detail in the drawings.

Connected to the cage, as in Fig. 6, are two uprights 290, which extend through longitudinal slots in the second deck and are connected above said deck by a cross-piece 291. An upright shaft 292, Fig. 1, is journaled at its upper end by means of a pivot-point on the lower side of the sleeve and is carried at its lower end by the cross-piece 291, so as to rotate therewith when the cage is rotated in swinging the arm. Shaft 292 carries a segment-gear 293, which meshes with the bevel 144 on the end of the sleeve 141, already described. This sleeve 141 carries one member of the second differential F, the planetary of which is connected to and rotates the angle-changing crank-shaft. Through this connection it will be seen that whenever the cage is turned by the turning of the sleeve on which it is mounted the crank-shaft 64 will be rotated by the action of the outer member 140 of the differential F, which is connected to be rotated with said cage. The apparent effect of this rotation of the outer member of the differential upon the planetary will of course depend upon the action of the other member of the differential, whether at rest or rotating in the same or different directions, and the speed of such rotation. The segment-gear 293 and the bevel-gear 144 are so proportioned that this rotation of the crank-shaft will correspond to the angular movement of the pen-arm.

*Compensation for extension.*—In order that the velocity determined for the swinging element by the crank-shaft may not be affected by the lengthening or shortening of the pen-arm by the reciprocating element, I provide means for compensating the speed of the swinging element as the pen-arm is reciprocated. As best shown in Fig. 4, carried at one end of the driven shaft of the harmonic variable-speed device C, from the other end of which velocity is transmitted to the reciprocable element, is a spirally-threaded sleeve 295, rotating with said shaft. A lever 296 is connected at one end to one of the guide-rods 90 of the auxiliary variable-speed device D. Carried at its other end is a feed-nut 297, for which said spiral acts as a lead-screw to carry back and forth as the shaft of speed device C is rotated. This feed-nut is mounted on trunnions within a yoke 298, which has a sliding fit in the end of lever 296, thus permitting the necessary longitudinal movement. Lever 296 is fulcrumed in a standard 299, which is carried by a plate adjustably secured to the second deck by set-screws passing through elongated slots in the plate. In this way as the shaft of speed device C is rotated to extend the pen-arm the position of the driven segment of speed device D with relation to its driving-cylinder is gradually changed, thereby varying in the same degree the velocity transmitted to the swinging element and obtaining a uniform swing of the reproducing-point, irrespective of its distance from the center of swing of the pen-arm.

*Unison devices—Theory and means.*—As applied to different receiving instruments on a single line the time element is not of importance. A marked advantage of this device over all that have preceded it in the art is the fact that there is no necessity for complicated devices for synchronizing instruments at different points of the line during their normal operation. The point at which the pen begins to operate, the absolute value of the ratio of the velocities, or the relative value of the ratio is not of importance, provided only there be identity in the received electrical signals. In view of the possibility of error from this source it is desirable to provide means for bringing various receiving instruments into unison that all the machines may start with the cranks and the speed device in their initial position. The means which are provided for securing this result are mainly electrical and are more fully set forth in the description of the wiring diagram which follows. It should be noted, however, that the upper pair of each set of electromagnets I I' M M' are adapted, when proper conditions are present in the line and receiving instrument, to set in operation devices which will return the crank-shaft to its initial position and the speed-arm 185 to center. In connection with the circuits for controlling the shaft to this end there are provided, as shown in Fig. 10, adjustable contacts 300, carried by arms projecting from the standards 301, which carry the boxes for the bearings of the guide or harmonic rods. These contacts are adapted to make contact with stops on vibrating reeds 302 when said vibrating reeds are thrown up and acted upon by the harmonic rods 90 coming in contact with the arms 303, connected to said reeds. The further mechanical devices which, as operated by suitable electrical means, act to bring the receiver or parts of the receiver to center are best illustrated in Figs. 29 to 31, inclusive. In these views the shaft 60, which is driven from the motor through the grooved pulley 57, carries a worm 305, meshing with a worm-gear 306, which is carried with a shaft 307, rotatably mounted between dead-centers on hangers 308.

Supported at the end of a hanger 309 is an electromagnet having a coil 310, surrounding a tubular core or spool 311 and also provided with an outer cylindrical soft-iron jacket 312. Shaft 307 passes freely through the center of this core and carries at its outer end an armature 313, free to move longitudinally thereon between the nut 314 and a disk 315, fast to the shaft adjacent the end of the core and preferably of soft iron or other magnetic material. The armature 313 carries rigidly therewith a spur-gear 316, which meshes with a spur-gear 317 on a shaft 318, journaled in dead-centers between hangers 332. The electromagnet is also provided with what may be termed an "armature" or "disk" of soft iron 319 at the opposite end from the movable armature and rigid with the shaft 307. When the magnet is energized, the armature 313 is attracted and clutched by friction to the disk 315, which thus acts both to provide a suitable surface and to increase the strength of the magnet. The armature being thus clutched to the shaft revolves therewith and through the described connections rotates the shaft 318. The armature 319 at the right hand of the electromagnet acts to resist the tendency of the electromagnet to draw the shaft 307 toward the right end, and thereby cause undue friction on one of its bearings. The tendency of the shaft to be drawn in the one direction, because of the pull of the magnet on the disk 315, will be counteracted by the tendency of the armature 319 to carry the shaft in the opposite direction. The shaft 318 carries two arms 320, each of which is provided with a stop 321, pivoted at the point 322, and having a short arm grooved to surround a pin projecting downwardly from the arm 320. The motion of the stop is positively checked in one direction by the head of this pin, and its motion in the other direction is yieldingly restrained by spring 323, surrounding the pin above the short arm 324. One of these arms 320 carries also a contact-point 325, adapted, when the arm is swung up to a suitable position, to engage an adjustable contact 326, carried by an arm 327, projecting from the hanger 332. The pivoted levers 321 act each as a stop to permit movement in one direction, but prevent movement in the other direction after contact therewith of a projection 330 from the speed-arm 185. (Shown in dotted lines in Fig. 29.) At the end of the shaft 318 is a miter engaging a miter on the end of the shaft 331, journaled in dead-centers between the hangers 332 and carrying arms 320, which are provided with spring-pressed stops 321, similar to those already described, adapted to prevent movement of the main crank-shaft 64 under certain conditions by engagement of said stops with the adjustable contact-points 333 on an arm 334, connected to the main crank-shaft. As the shafts 318 331 are rotated the arms carrying the spring-stops are gradually thrown up into the position shown in Figs. 29, 30, and 32. When in such position, if the speed-arm is off center and swung through the escapement control already described, one of the stops 321, which is in the path of the speed-arm 185, will be pushed down against its spring-pressure, and the speed-arm will swing until it is checked at center by contact with the other stop. This speed-arm will then be in its desired center position, and further movement thereof which would tend to carry it away from such position will be prevented. If the magnet-coil 310 is still energized, the armature 313 will slip, inasmuch as the shaft 318 cannot be driven after 325 contacts with 326. The contacts at 325 326 close a break in a circuit, the purpose of which will be fully explained in connection with the wiring diagram. When the circuits controlling the shafts 318 and 331 are broken by the return of the speed-arm and of the crank-shaft to center, which deënergizes the magnet 310 and disconnects the shafts 318 and 331 from the shaft 307, by which they are driven, the weight of the arms 320, connected to said shafts, will carry the arms down, so that they hang vertically, thus removing the spring-stops 321 from the paths of the speed-arm 185 and of the arm 334, connected to the main crank-shaft.

Referring again to Fig. 5, it should be noted that there is an advantage in the construction illustrated in that the magnet 274 and its plunger, by which the pencil-lifting wire is actuated, are situated substantially at the pivotal center of the swinging arm, whereby any movement of the arm about its pivotal center will not change the relation between the wire 270 and the plunger 273. A further advantage in efficiency of operation is obtained by the adjustment of the magnet 274, which can be obtained by means of a nut 274ª, screwing onto the threaded upper end of the magnet-housing and bearing against the upper side of a nut which screws down into the top of the cylinder 18.

An important feature of the construction illustrated in Fig. 12, wherein the shaft of the variable-speed device is provided with coils 104 in order to provide for a magnetic increase of friction between the driving and driven members of the variable-speed device resides in the fact that with this construction the rolling of the driving-segment upon its cylinder does not lengthen the path of the lines of force of the magnetic field, and consequently there is no resistance offered by the magnetic field to the rolling of the segment upon the cylinder. As stated in different words, there is provided a magnetic means for increasing the friction between the segment and cylinder, while at the same time the path of the segment as it is rolled upon the cylinder is in a substantially equipotential field. Thus the magnetic force at that point is utilized entirely for the desired object and is not diverted in any injurious restraint of the moving parts. The advantage of this feature in an instrument wherein it is desirable to transmit power or velocity with great accuracy and at the same time provide for an ease of variation of the velocity transmitted will be obvious.

*Wiring diagram.*—The general system is outlined and the various circuits shown diagrammatically in Fig. 35. As here shown, this system is intended to be utilized in connection with a normally closed main-line telegraphic circuit. (Shown in heavy black lines.) It will be obvious, however, that the system could be adapted for use with any of the various systems now in use in telegraphic and other circuits. The current is derived from the battery 340, one pole of which is normally presented to the ground through the wire 341, the circuit-preserving polarized changer 342, and the wire 343. The opposite pole of the battery is presented to the line through either of the wires 344 or 345, (depending upon the strength of the current which it is desired to use, as will be hereinafter explained,) thence through the wire 346, through the reed 347 of the circuit-preserving pole-changer and the pivoted armature 348 in connection therewith, through the wire 349 and the armature 350 of a neutral relay, thence through the wire 351, and through the switch 352 to the receiver. By throwing switch 352 to the contact 353 the line may be thrown directly to the ground through wire 354, thus cutting out the battery and the transmitter, leaving the operation of the receiver to be controlled entirely by a battery and transmitter at another point in the line. From the coils of a first neutral relay 355 in the receiver the line passes through the coils of polarized switch 356, thence out through a second neutral relay 357, and out into the line, as at 358. As here illustrated, the neutral relays 355 357 are those commonly used in connection with telegraphic circuits. The first relay 355 is adapted to be operated whenever the current through the line is broken, while the second relay 357 is operated only by increasing the strength of the current in the line. The pole-changing switch 356 acts simply as a switch, its position depending upon the direction of the current through the line whether such current is weak or strong. The first or weak relay which operates whenever the current through the line is broken closes the circuit through one or the other of the angle-changing escapements H H', depending upon the position of the polarized switch, thus rotating the main crank-shaft of the receiver, while the second or strong relay operates whenever an additional strength of current is sent into the line to actuate the speed-changing escapements L L'. The means provided for breaking the line-circuit is embodied in the rotary element of the transmitter in connection with the circuits controlled thereby, this rotary element or disk 203 being shown diagrammatically in this view. The armature 350, which is embodied in the main-line circuit, is under the control of an electromagnet 359, which is included in a local circuit controlled by the rotary disk. This circuit runs from the positive pole of the local battery 360 through wire 361, thence through the wire 362, the coils of the magnet 359, and the wire 363, and thence back to the positive pole of the battery, a break therein being closed whenever the reed 208 is vibrated by the rotation of the toothed disk 203. When the local circuit through the electromagnet 359 is closed in this way, the armature 350 is drawn away from its back stop and the main-line circuit is broken, thus operating the weak relay 355.

Under normal conditions the main-line circuit from the battery 340 is completed through the wire 344, which is connected to a part of the cells of the battery. When, however, it is desired to send a strong current through the line in order to operate the second neutral relay 357, the full strength of the battery is made available by closing the circuit from battery to line through the wire 345, which throws into the circuit all the cells of the main battery. This is done in the following manner: A circuit-preserving transmitter embodies a member 364, pivoted midway of its length, which is adapted when the circuit is closed through the electromagnet 365 to release the reed 366, and thereby close the line-circuit through all the cells of the battery. The electromagnet 365 is included in a local circuit which is normally open and may be closed by the operation of the toothed segment 225 actuating the reed 223, as will be apparent. Thus upon operation of the toothed segment 225 the strength of the current in the line is increased and the armature of the neutral relay 357 is drawn from its back stop to its front stop. The polarized switch 356 acts as a selecting device between the two local escapement-circuits to which the weak relay is common, and also between the two other local escapement-circuits of the strong relay. Its operation is dependent upon the direction of the current through its coils irrespective of strength. Its operation thus further differentiates the selective action begun by the neutral relays, so that four local circuits each controlling an escapement are under the control of the main-line circuit.

The direction of the current through the line is determined as follows: The differential pole-changer P is mechanically connected with both the disk circuit-closer and the segment circuit-closer, and the connection is such, as already stated, that the turning of the disk or segment in either direction will correspondingly determine the polarity of the current through the local circuit of the polarized-circuit-preserving pole-changer 342. With the contacts in the position in which they are shown in the diagram, the circuit may be traced from the positive pole of the battery 360, through the wire 367, to the positive contact of the pole-changer, thence through the wire 368 to the coils of the circuit-preserving pole-changer 342 and back through the wire 369 and the negative contact of the differential pole-changer to the battery. If, however, the rotary disk or the segment had been moved in the opposite direction, the pole-changer P would have been thrown to the opposite pair of contacts and the local circuit would then be made from the positive pole of the battery through the wire 367, the positive contact in the lower left-hand corner of the pole-changer, thence through the wire 369 and through the coil of the circuit-preserving pole-changer 342 in the opposite direction to that before, back to the negative contact in the first pole-changer, and thence back to the battery.

The operation of the circuit-preserving pole-changer as embodying a fixed contact connected to ground, a vibrating armature connected to line, and two reeds connected one to the positive and one to the negative pole of the main battery and adapted one to be presented to the ground, while the other is connected to line by the vibrating armature, the elasticity of the reeds at the same time providing for the preservation of a circuit in one direction up to the time when it has been made in the other direction, will be sufficiently clear without further description.

The circuits through the various electromagnets, whether those which control the angle-changing device, the speed-changing device, or the unison-escapements, may be readily traced upon the diagram with the relays in any given position, as shown, and it will be obvious that changes in the polarity and strength of the main-line circuits through the instrumentalities already described will cause a corresponding selection from various electromagnets of the one desired.

Assume that the polarized switch 356 has been thrown to the desired position, as on the right-hand set of contacts, by turning the rotary disk of the transmitter in the desired direction, which, through the mechanical means described, will be accomplished before the main-line circuit is broken. Then, upon breaking the main line by means of the same rotary disk the armature 370 of the first neutral relay will be released and sprung to its back stop. The circuit from the battery 371 of the receiving instrument will then be as follows: from the negative pole of the battery through the wire 372, the armature 373 of the strong relay (which will be on its back stop) through the wire 374, the armature and back stop of the weak relay through the wire 375, through the electromagnet H back through the wire 376, through the polarized switch and back through the wire 377 to the positive pole of the battery. Thus, then, the described manipulation of the rotary disk will have caused the escapement-magnet H to be energized, the number of times during which said magnet is energized and the escapement is operated depending upon the amount of rotation of the disk and the consequent number of times the local circuit is closed by the reed 208. If the rotary disk had been turned in the other direction, it will be seen that through the instrumentality described the polarity of the circuit through the polarized switch 356 would be reversed and the armature thereof thrown to the opposite pair of contacts, which will cause the other electromagnet, H', of the pair to be energized, thereby allowing the same amount of rotation of the crank-shaft, but in the opposite direction. By manipulation of the toothed segment 225 the polarized switch 356 will first be adjusted to the proper side, depending upon the direction of the movement of the toothed segment, and then by the closing of 220 of the local circuit of the circuit-preserving transmitter 364 an additional number of cells of the battery 340 will be thrown into the main line, thereby drawing the armature 373 of the strong relay from its back stop to its front stop. The circuit from the battery 371 will then be as follows: from the negative pole of the battery through the wire 372, the armature of the strong relay, the front stop and the wire 378, the electromagnet L, thence back through the wire 379, the switch, and the wire 377 to the positive pole of the battery. Changing the position of the switch would cause the other electromagnet, L', of the pair to be thrown into the circuit, thereby operating its escapement and permitting the rotation of the speed-shaft in the other direction.

The pencil-lifting circuits comprise a local circuit 380, the electromagnet of which controls an armature 275, which represents diagrammatically the mechanical means for lifting the pen. This local circuit is closed when desired at the contact 287 by the operation of the alternating contact device, as in Figs. 33 and 34, which in turn is connected to and acts with the armature 277 of an electromagnet 276, which is included in a second local circuit adapted to be closed at 200 by the reed 196, this reed being vibrated by the speed-arm 185 whenever said speed-arm, controlled as already described, moves one step off center in either direction.

The unison devices, comprising the two pairs of escapement-releasing electromagnets I I' M M' and the selecting devices for determining which magnet of each pair is to be brought into operation, are included in the circuits as follows: Whenever the main-line circuit is inoperative—that is, at any time when no signal is being sent through the line—the unison-escapements will be automatically actuated to bring all the instruments which may be connected in one circuit in unison with each other, as before explained—that is, each machine is brought so that its harmonic rods are in a given position, preferably with the speed device at zero and one of the harmonic rods at zero, so that the instruments will start upon the renewal of signals from a common direction. In the diagram, as shown, the harmonic rods and the speed-changing lever are already in this position. Assume then that the harmonic rod 90 upon the cessation of signals is off center toward the right, thereby holding the reed 302 against the contacts 300, the circuit will be closed from the battery 371, which may be traced from the negative pole through the wire 372 to the armature and back stop of the strong relay, thence through the wire 374 and the front stop of the weak relay, through the electromagnet of the clutch 310, through the wire 387, reed 302, and the wire 388 to the positive pole of the battery. Through the mechanical connections before described the energizing of the magnet-clutch raises the arm 320 and closes a circuit through the unison-escapements as follows: from the negative pole of the battery 371 through the contact 326, the wire 389, the escapement-magnet I, through the wire 390, the contact 300, and back through the common return-wire 388 to the positive pole of the battery. The energizing of this unison escapement-magnet will release the crank-shaft and allow it to rotate until the circuit through the magnet is broken at 300, which will occur when the harmonic rod 90 has been returned to center. If the harmonic rod is off center on the other side, the circuit will be closed through the other electromagnet, I', and the crank-shaft allowed to rotate in the opposite direction until equilibrium is restored. In like manner if the speed-arm is off center, so as to bring the reed 192 into engagement with the contacts 191, a circuit will be closed after the proper interval, which may be traced from the negative pole of the battery 371 through the contacts 325 326, through the wire 389, and the branch wire 391, thence through the electromagnet M of the pair of unison-magnets in connection with the speed-changing device, back through the wire 392, through the contact 191, the reed 192, and wire 388 to the positive pole of the battery. This circuit will remain closed, and the escapement will allow the speed-changing device to operate until the circuit is broken at 191 by the returning of the speed-lever to center, whereupon the parts will be in equilibrium. If the speed-lever is off center to the other side, the corresponding circuit will be closed through the other of the unison escapement-magnets, M', which will restore the parts to equilibrium. The coils 104 about the axes of the speed-changing devices, as illustrated diagrammatically in this figure, may be included in an electric circuit derived from any given source by suitable connections to the two contacts 393 393 in order to provide the desired magnetic friction in the variable-speed couples.

It will be obvious that the underlying features of this invention may be of use broadly in a great variety of relations. The receiver constitutes a curve-tracer capable of producing a variety of curves—as, for example, by proper adjustment and control of the cranks it may be made to trace eclipses, harmonic and other curves, and to repeat the same indefinitely. For this purpose a single receiving instrument only is necessary, and it may be used with or without the transmitter and circuits, as the crank-shaft may be readily adjusted by hand to procure the necessary position of the cranks for many curves. If, in addition, motion be imparted to the surface, the trace of the point is a resultant of all three motions. The latter condition does not arise in the ordinary operation of the machine as employed in geometric telegraphy.

An embodiment of the invention has been shown in the drawings and described in connection therewith as applied to a system of component velocities wherein the direction of the components is substantially at right angles to each other.

A variety of arrangements of the cranks and rods, which we may designate arbitrarily as the "harmonic rods," is possible without altering the result. The harmonic rods instead of being parallel to the same diameter of the circle in which the crank rotates may be made parallel, respectively, to two diameters having a rectangular relation to each other. Under this condition the cranks would be parallel to each other instead of at right angles. In general the arrangement of the cranks and harmonic rods moved by them should be such that when one is moved through a distance proportional to the sine of a given angle the other will be moved through a distance proportional to the cosine of the same angle.

If it were desired that the velocities of the tracing-point be developed in the more complex systems of coördinates, the relative arrangement of the cranks, rods, and guides would undergo a variety of changes; but in every case the movement of the harmonic rod is proportional to a projection of the rotating crank, although not necessarily equal to it, upon a rectangular ordinate the inclination of which to the given ordinate is complementary.

In all systems, rectangular or oblique, the angular relation of guides to harmonic rods equals the characteristic angle of the given system.

The guides may be actuated by a single crank or plurality of cranks. A variety of arrangements of the cranks and harmonic rods is possible, provided such relative arrangement be maintained that the angle included between the one rod and its actuating-crank added to the angle between the other rod and its crank is equal to the characteristic angle of the system. If this relation exists in any one position or phase of the rotatable shaft to which the cranks are fixed, it is obvious that it will be true for all positions of said shaft. Inasmuch as the underlying principles of this invention are broadly new, I consider that I am entitled to a broad interpretation both of the specification and claims and to the broad construction which is given to a pioneer invention as to mechanical equivalents, reversal of parts, and the like.

Certain of the generic features of this invention also are applicable, broadly, in connection with many systems, methods, and mechanisms or sets of mechanisms where it is desired to control accurately and readily the motion or direction of moving parts. Obviously it is especially applicable for the solution of difficulties which are encountered in providing for the control of compositions of motions wherever such control is desirable.

Having described my invention, what I claim as new, and desire to secure by Letters Patent, is—

1. The method of recording graphic processes which consists in transmitting a signal or set of signals indicative of a desired direction of movement, thereby regulating the receiving instrument for recording such direction, transmitting an independent signal or set of signals which shall control the actuation of said instrument, and recording said direction of movement.

2. The method of recording graphic processes which consists in transmitting one signal or set of signals indicative of a desired direction, causing the receiving instrument to be fixed in position to reproduce said direction, and transmitting another signal or set of signals indicative of the rate of speed of reproduction in the direction determined.

3. The method of recording graphic processes which consists in transmitting a signal or set of signals uniform in character, indicative of a desired direction, causing the receiving instrument to be fixed in position to reproduce said direction, and transmitting another signal or set of uniform signals by the same circuit indicative of the rate of speed of reproduction in the direction determined.

4. The method of recording graphic processes which consists in transmitting one signal or set of uniform signals indicative of a desired direction, causing the receiving instrument to be fixed in position to reproduce said direction, and transmitting another signal or set of uniform signals by the same circuit, but independent of said direction signals, indicative of the rate of speed of reproduction in the direction determined.

5. The method of recording graphic processes which consists in transmitting a signal or set of signals indicative of a given ratio, deriving velocities in a receiving instrument, compounding said velocities in accordance with that ratio, and recording the resultant thereof.

6. The method of recording graphic processes which consists in transmitting a signal or set of signals indicative of a given ratio, regulating in accordance with such signals a receiving instrument so that it shall be in a position to compound velocities in that ratio, and transmitting an independent signal or set of signals which shall set in operation such instrument to supply velocities for such composition.

7. The method of recording graphic processes, which consists in transmitting a signal or set of signals indicative of an angle characteristic of a desired direction, reproducing said angle in a receiver, and deriving in said receiver a line which is the resultant of two velocities compounded in the ratio of the sine and cosine of said angle.

8. The method of recording graphic processes, which consists in transmitting a signal or set of signals indicative of an angle characteristic of a desired direction, reproducing said angle in a receiver, and deriving in said receiver a line, which is the resultant of two velocities so compounded as to characterize the indicated angle.

9. The method of reproducing graphic processes which consists in sending a signal or set of signals from the transmitting end, which shall indicate an angle characteristic of a desired direction, varying velocities derived from a prime mover at the receiving end in the ratio of the sine and cosine of that angle, compounding the velocities so varied, recording the resultant thereof, and controlling the values of the velocities derived from the prime mover by a second signal or set of signals sent from the transmitting end over the same line.

10. The method of reproducing graphic processes which consists in sending a signal or set of signals from the transmitting end, which shall indicate an angle characteristic of a desired direction, varying two velocities derived from a prime mover at the receiving end in the ratio of the sine and cosine of that angle, compounding the velocities so varied in directions transverse to each other, and recording the resultant thereof.

11. The method of reproducing graphic processes which consists in sending a signal or set of signals from the transmitting end, which shall indicate an angle characteristic of a desired direction, varying velocities derived from a prime mover at the receiving end in the ratio of the sine and cosine of that angle, compounding the velocities so varied in direction transverse to each other, recording the resultant thereof, and controlling the values of the velocities derived from the prime mover by a second signal or set of signals sent from the transmitting end.

12. The method of reproducing graphic processes which consists in sending a signal or set of signals from the transmitting end, which shall indicate an angle characteristic of a desired direction, varying velocities derived from a prime mover at the receiving end in the ratio of the sine and cosine of that angle, compounding the velocities so varied in directions transverse to each other, recording the resultant thereof, and controlling the values of the velocities derived from the prime mover by a second signal or set of signals sent from the transmitting end over the same line.

13. The method of reproducing graphic processes, which consists in sending a signal or set of signals from the transmitting end, which shall indicate an angle characteristic of a desired direction, varying velocities derived from a prime mover at the receiving end in the ratio of the sine and cosine of that angle, compounding the velocities so varied in directions transverse to each other, recording the resultant thereof, and controlling the values of the velocities derived from the prime mover by a second signal or set of signals sent from the transmitting end over the same line, but independent of said first-mentioned signals.

14. The method of reproducing and recording graphic processes which consists in indicating graphically at the transmitting end a desired direction of movement, transmitting a signal or set of signals which shall indicate at the receiving end an angle characteristic of said direction, supplying velocities at the receiving end, varying said velocities in the ratio of the sine and cosine of the indicated angle, compounding the velocities so varied, and indicating the resultant thereof.

15. The method of recording graphic processes which consists in controlling a circuit from a circuit-controlling transmitter at the transmitting end of the circuit, actuating a receiver at the receiving end of the circuit in accordance therewith, and also actuating a receiving instrument at the transmitting end of the circuit in accordance therewith, in order to illustrate graphically the operation of the circuit-controlling transmitter for the guidance of the operator thereof.

16. The method of recording graphic processes which consists in transmitting a signal or set of signals which shall indicate the relation of the ordinates of a desired direction, transforming such index-signals at the receiving instrument into the ordinates themselves and compounding said ordinates to obtain the desired direction.

17. The method of recording graphic processes which consists in transmitting over a single circuit a signal or set of signals which shall indicate the relation of the ordinates of a desired direction, transforming such index-signals at the receiving instrument into the ordinates themselves and compounding said ordinates to obtain the desired direction.

18. The method of recording graphic processes, which consists in transmitting a signal or set of signals which shall indicate the ordinates of a desired direction, controlling the receiving instrument by means of such signals so that it shall be in position to record said direction and transmitting another signal or set of signals which shall control the movement of the reproducing member of the receiving instrument in said direction.

19. The method of recording graphic processes which consists in transmitting a signal or set of signals which shall indicate the ordinates of a desired direction, controlling the receiving instrument by means of said index-signals so as to bring it into position to record the desired direction and transmitting another signal or set of signals over the same line which shall control the movement of the reproducing member of the receiving instrument in the said direction.

20. The method of recording graphic processes which consists in sending signals which are characteristic of any desired angle, reproducing said angle in a receiving instrument, thereupon varying two derived velocities such that the ratio between them shall be that of the sine and cosine of the given angle, compounding said velocities to characterize the desired direction and recording the resultant.

21. The method of recording graphic processes which consists in sending from a transmitting instrument signals which shall indicate the relation of the ordinates, of a desired direction, transposing such index-signals at the receiving instrument into the ordinates themselves and compounding velocities derived at the receiving instrument in accordance with said ordinates.

22. The method of recording graphic processes which consists in sending a signal or set of signals characteristic of a given angle, thereupon reproducing said angle at the receiving instrument and determining a desired direction thereby and finally causing said direction to be recorded.

23. The method of recording graphic processes which consists in sending a signal or set of signals characteristic of a given angle, thereupon reproducing said angle at the receiving instrument and determining a desired direction thereby, and sending a second signal or set of signals which shall determine the extent of motion in said direction.

24. The method of recording graphic processes which consists in indicating an angle, reproducing that angle in a system of ordinate axes, thereupon developing two velocities in the proportion of the ordinates indicated, compounding said velocities in said ordinate relation, and recording the resultant thereof.

25. The method of recording graphic processes which consists in transmitting a signal or set of signals indicative of an angle, reproducing that angle in accordance therewith in a system of ordinate axes, developing two velocities in the proportion of the ordinates indicated, compounding said velocities in said ordinate relation, and recording the resultant thereof.

26. The method of recording graphic processes which consists in sending from a transmitting instrument uniform signals which shall indicate the relation of the ordinates of a desired direction, transforming such index-signals at the receiving instrument into the ordinates themselves and compounding velocities derived at the receiving instrument in accordance with said ordinates.

27. The method of recording graphic processes which consists in sending from a transmitting instrument an indication of location in a plane in terms of a single numerical value, analyzing said value at the receiving end into two interdependent values and recombining said values to produce a graphic record.

28. The method of recording graphic processes which consists in indicating a value characteristic of a mathematical function of a direction, deriving said direction from the value so indicated and causing said direction to be recorded.

29. The method of recording graphic processes which consists in indicating a value significant of an angle, compounding two velocities in the proportion of two of the mathematical functions of said angle and recording the resultant.

In testimony whereof I affix my signature in the presence of two witnesses.

GRANT B. ROSSMAN.

Witnesses:
H. M. SEAMANS,
M. E. HALL.